US007215744B2

(12) United States Patent
Scherer

(10) Patent No.: US 7,215,744 B2
(45) Date of Patent: *May 8, 2007

(54) CALL PROCESSING SYSTEM WITH CALL SCREENING

(75) Inventor: Gordon F. Scherer, Westerville, OH (US)

(73) Assignee: Convergys CMG Utah Inc., Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/389,698

(22) Filed: Mar. 27, 2006

(65) Prior Publication Data

US 2006/0182234 A1    Aug. 17, 2006

Related U.S. Application Data

(63) Continuation of application No. 09/573,734, filed on May 18, 2000, now Pat. No. 7,035,384, which is a continuation of application No. 08/633,507, filed on Apr. 17, 1996, now Pat. No. 5,867,562.

(51) Int. Cl.
*H04M 1/64* (2006.01)

(52) U.S. Cl. .............................. 379/88.19; 379/207.15

(58) Field of Classification Search .............. 379/67.1, 379/88.01, 201.01, 201.02, 201.07, 201.08, 379/207.02, 207.11, 207.13, 207.14, 207.15, 379/127.01, 68.01
See application file for complete search history.

(56) References Cited

U.S. PATENT DOCUMENTS

| | | | |
|---|---|---|---|
| 4,582,956 A | 4/1986 | Doughty | |
| 4,759,056 A | 7/1988 | Akiyama | |
| 4,792,968 A | 12/1988 | Katz | |
| 4,845,739 A | 7/1989 | Katz | |
| 4,858,120 A | 8/1989 | Samuelson | |
| 4,930,150 A | 5/1990 | Katz | |
| 4,932,046 A | 6/1990 | Katz et al. | |
| 4,939,773 A | 7/1990 | Katz | |
| 4,975,945 A | 12/1990 | Carbullido | |
| 4,987,590 A | 1/1991 | Katz | |
| 4,989,233 A | 1/1991 | Schakowshy et al. | |
| 4,994,797 A | 2/1991 | Breeden | |
| 5,001,710 A | 3/1991 | Gawrys et al. | |
| 5,008,930 A | 4/1991 | Gawrys et al. | |
| 5,014,298 A | 5/1991 | Katz | |
| 5,016,270 A | 5/1991 | Katz | |
| 5,018,191 A | 5/1991 | Catron et al. | |
| 5,025,468 A | 6/1991 | Sikand et al. | |

(Continued)

OTHER PUBLICATIONS

Office Action dated Jul. 29, 2004 for U.S. Appl. No. 09/573,734, filed May 18, 2000.

(Continued)

*Primary Examiner*—Fan Tsang
*Assistant Examiner*—Olisa Anwah
(74) *Attorney, Agent, or Firm*—Frost Brown Todd LLC

(57) ABSTRACT

A system is described in which call processing considers unique information about the call to better serve the caller and/or to enable the called party to more efficiently handle the call. In one embodiment, the unique information considered by the call processor is information indicator digits, which may indicate to the called party whether to accept the call before the voice portion of the call is initiated.

26 Claims, 9 Drawing Sheets

U.S. PATENT DOCUMENTS

| | | | |
|---|---|---|---|
| 5,033,079 A | 7/1991 | Catron et al. |
| 5,046,088 A | 9/1991 | Margulies |
| 5,048,075 A | 9/1991 | Katz |
| 5,073,929 A | 12/1991 | Katz |
| 5,091,933 A | 2/1992 | Katz |
| 5,103,449 A | 4/1992 | Jolissaint |
| 5,109,404 A | 4/1992 | Katz et al. |
| 5,128,984 A | 7/1992 | Katz |
| 5,164,983 A | 11/1992 | Brown et al. |
| 5,181,239 A | 1/1993 | Jolissaint |
| 5,185,782 A | 2/1993 | Srinivasan |
| 5,185,787 A | 2/1993 | Katz |
| 5,214,688 A | 5/1993 | Szlam et al. |
| 5,218,631 A | 6/1993 | Katz |
| 5,224,153 A | 6/1993 | Katz |
| 5,226,075 A | 7/1993 | Funk et al. |
| 5,251,252 A | 10/1993 | Katz |
| 5,255,309 A | 10/1993 | Katz |
| 5,259,023 A | 11/1993 | Katz |
| 5,259,026 A | 11/1993 | Johnson |
| 5,278,894 A | 1/1994 | Shaw |
| 5,297,197 A | 3/1994 | Katz |
| 5,299,260 A | 3/1994 | Shaio |
| 5,309,505 A * | 5/1994 | Szlam et al. ............. 379/88.01 |
| 5,311,507 A | 5/1994 | Bedrossian |
| 5,311,572 A | 5/1994 | Friedes et al. |
| RE34,677 E | 7/1994 | Ray et al. |
| 5,349,633 A | 9/1994 | Katz |
| 5,351,285 A | 9/1994 | Katz |
| 5,355,406 A | 10/1994 | Chencinski et al. |
| 5,359,645 A | 10/1994 | Katz |
| 5,365,575 A | 11/1994 | Katz |
| 5,375,161 A | 12/1994 | Fuller et al. |
| 5,377,186 A | 12/1994 | Wegner et al. |
| 5,425,091 A | 6/1995 | Josephs |
| 5,442,688 A | 8/1995 | Katz |
| 5,444,774 A | 8/1995 | Friedes |
| 5,473,679 A | 12/1995 | La Porta et al. |
| 5,495,521 A | 2/1996 | Rangachar |
| 5,511,117 A | 4/1996 | Zazzera |
| 5,539,812 A | 7/1996 | Kitchin et al. |
| 5,550,911 A | 8/1996 | Bhagat et al. |
| 5,553,129 A | 9/1996 | Partridge, III |
| 5,555,299 A | 9/1996 | Maloney et al. |
| 5,559,855 A | 9/1996 | Dowens et al. |
| 5,559,856 A | 9/1996 | Dowens |
| 5,559,857 A | 9/1996 | Dowens |
| 5,574,776 A | 11/1996 | Leuca et al. |
| 5,594,784 A | 1/1997 | Valius |
| 5,619,557 A | 4/1997 | Van Berkum |
| 5,625,680 A | 4/1997 | Foladare et al. |
| 5,666,400 A | 9/1997 | McAllister et al. |
| 5,684,872 A * | 11/1997 | Flockhart et al. ...... 379/266.08 |
| 5,696,818 A | 12/1997 | Doremus et al. |
| 5,723,130 A | 3/1998 | Hancock et al. |
| 5,768,356 A | 6/1998 | McKendry et al. |
| 5,867,562 A | 2/1999 | Scherer |
| 5,870,464 A | 2/1999 | Brewster et al. |
| 5,946,386 A | 8/1999 | Rogers et al. |
| 6,188,751 B1 | 2/2001 | Scherer |

OTHER PUBLICATIONS

Bellcore Bell Communications Research binder, Switching System Generic Requirements for Interexchange Carrier Interconnection Using the Integrated Services Digital Network User Part (ISDNUP), Generic Requirements, GR-394-CORE, Issue 1, Feb. 1994 (Generic Requirements GR-394-ILR Issue 1B, Jun. 1994—on first page in binder).

Bellcore Bell Communications Research binder, Generic Requirements for the Administrative System (AS)/Line Information Database (LIDB)—LIDB Interface, Generic Requirements, GR-446-CORE, Issue 1, Dec. 1993.

Bellcore Bell Communications Research binder, Common Channel Signaling Network Interface Specification (CCSNIS) Supporting Network Interconnection, Message Transfer Part (MTP), and Integrated Services Digital Network User Part (ISDNUP), Generic Requirments, GR-905-CORE, Issue 1, Mar. 1995.

Bellcore Bell Communications Research binder, Switching System Generic Requirements for Call Control Using the Integrated Services Digital Network User Part (ISDNUP), Generic Requirements, GR-317-CORE, Issue 1, Feb. 1994 (Generic Requirements, GR-317-CORE, Issue 1, Feb. 1994, Revision 1, Sep. 1994—on first page in binder).

Bellcore Bell Communications Research binder, Bell Communications Research Specification of Signaling System No. 7, Technical Reference, TR-NWT-000246, Issue 2, vol. 1 (Technical Reference, TR-NWT-000246, Issue 2, Jun. 1991, Revision 3, Dec. 1993, vol. 1—on first page in binder).

Bellcore Bell Communications Research binder, Bell Communications Research Specification of Signaling System Bell 7, Technical Reference, TR-NWT-000246, Issue 2, vol. 2 (Technical Reference, TR-NWT-000246, Issue 2, Jun. 1991, Revision 3, Dec. 1993, vol. 2—on first page in binder).

Harris Corp. Slide Presentation (25 pages)—date uncertain.

V&H Coordinates Data, Bellcore, pp. 1-5 and Appendix A-1, pp. 1-6, Jan. 15, 1996.

Local Exchange Routing Guide General Information, Bell Communications Research, Dec. 1, 1995, Section 1, pp. 168-173.

NXXTYPEMATRIX, Sep. 22, 1995, Timothy G. Mulligan (1 pg.).

Appendix A: SS7 Messages, Generic Requirements for Call Control Using ISDNUP, Feb. 1994, Issue 1, pp. A-1 to A-8.

Appendix B: SS7 Parameters, Generic Requirements for Call Control Using ISDNUP, Feb. 1994, Issue 1, pp. B-1 to B-39.

* cited by examiner

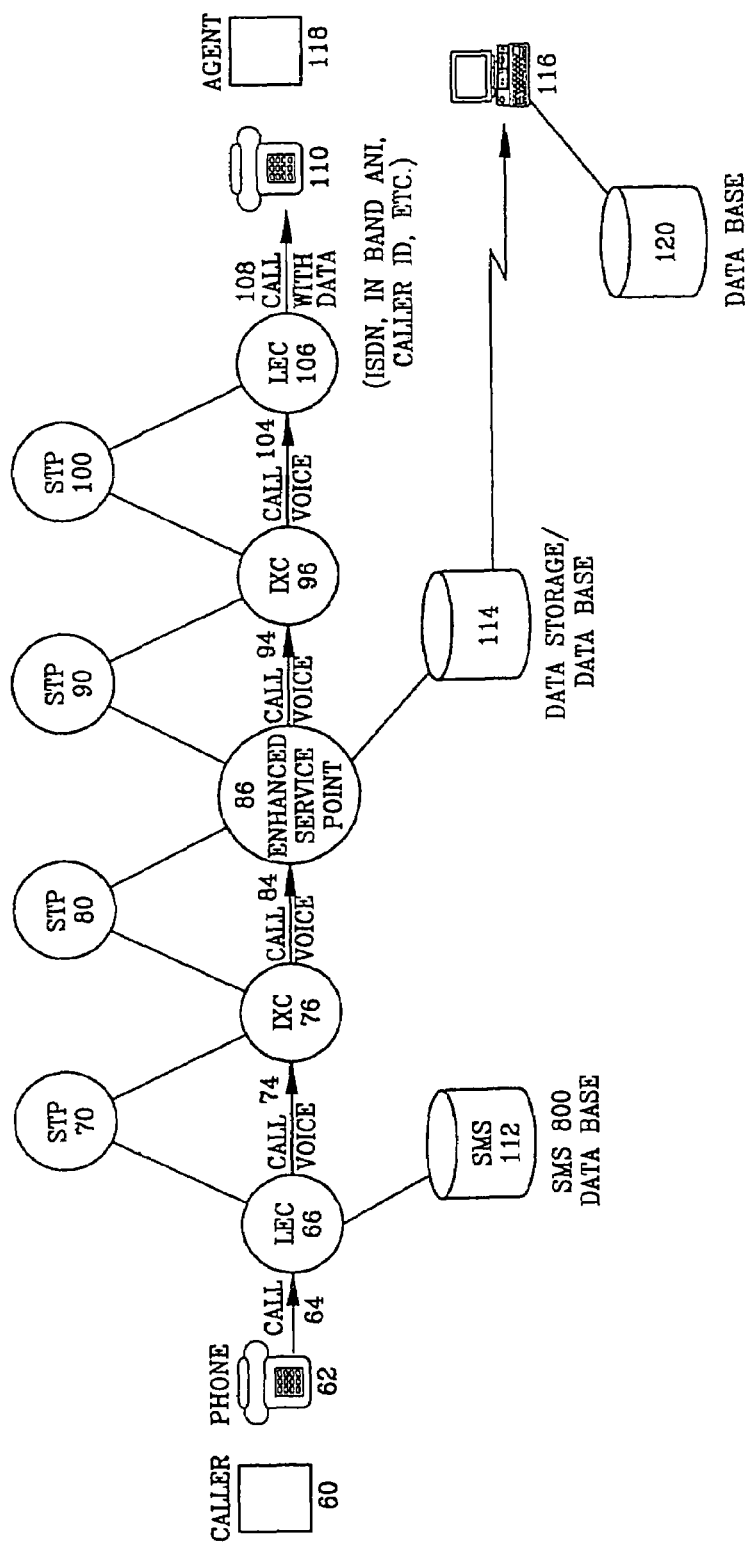
FIGURE #2: SIMPLIFIED CALL FLOW–CALL DATA TRAVELS SEPARATELY FROM VOICE PATH OF CALL.

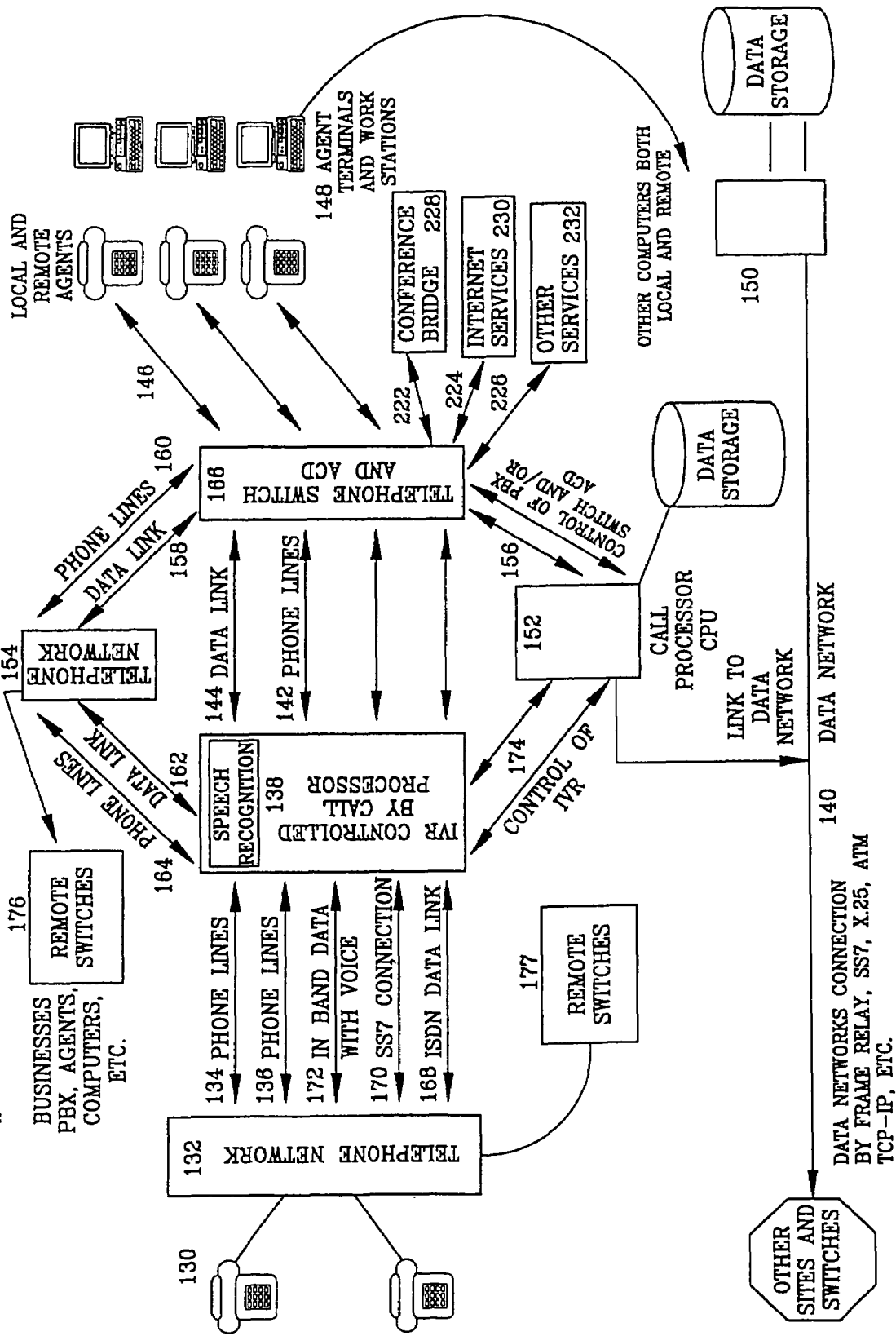

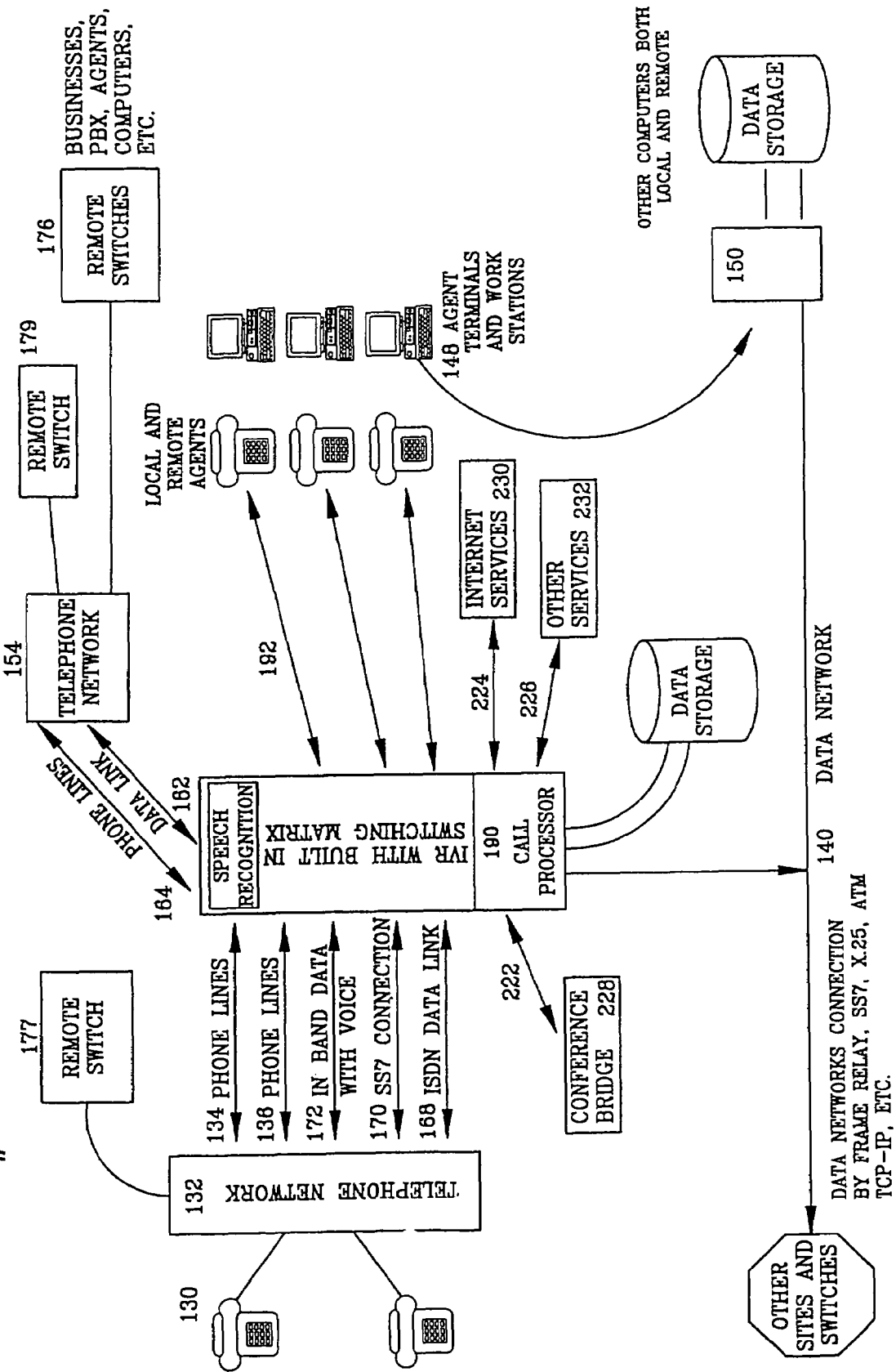

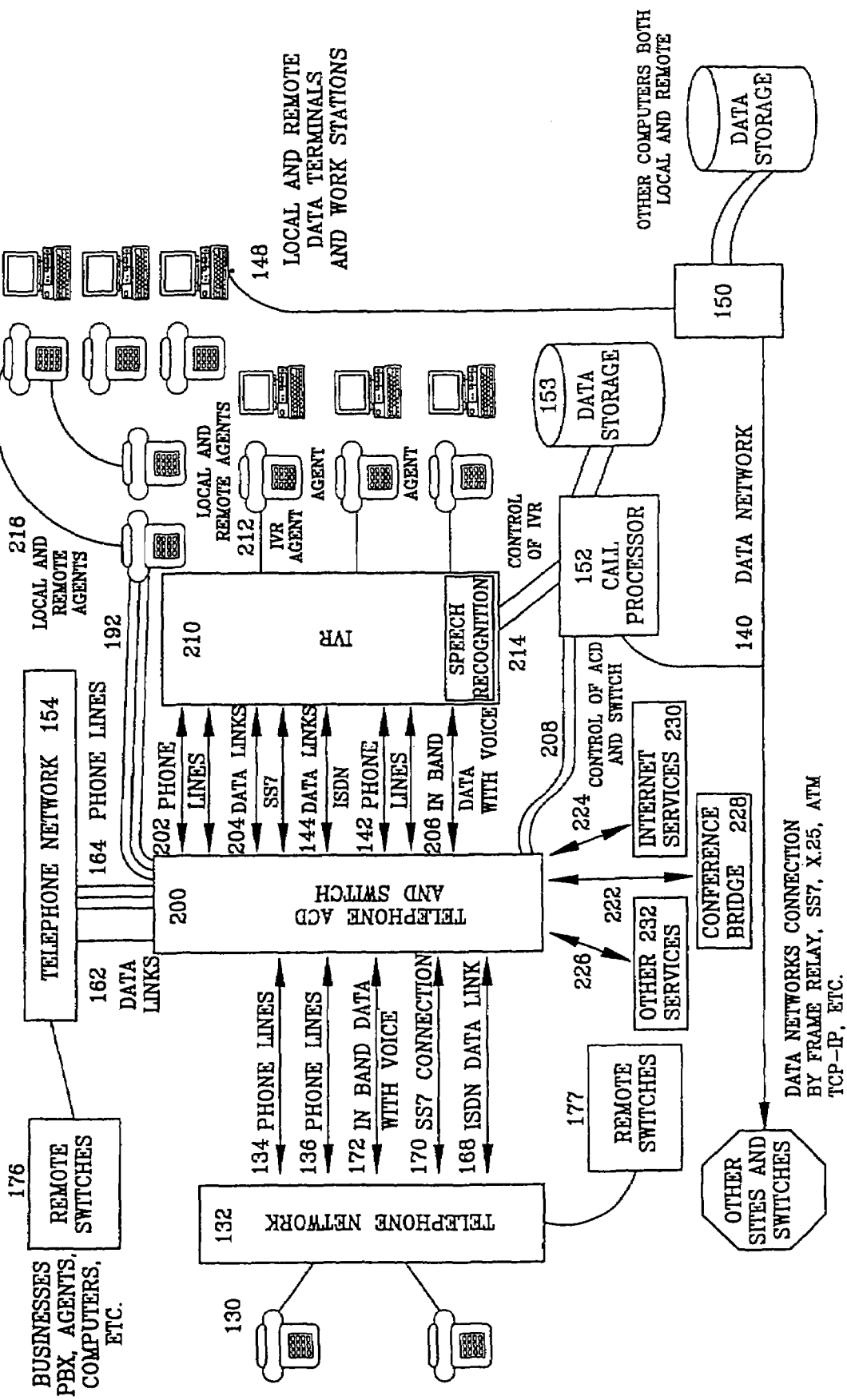

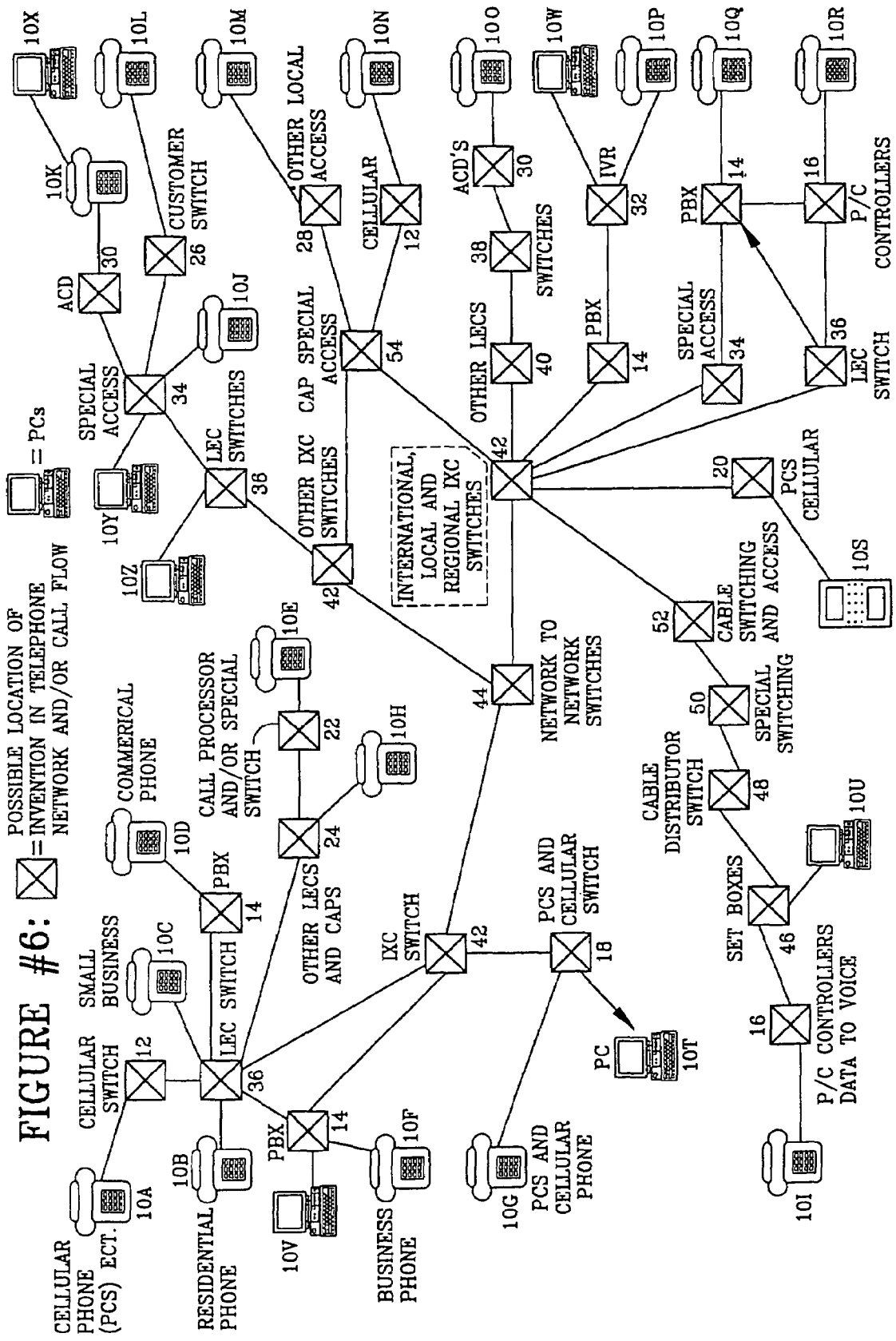
FIGURE #6

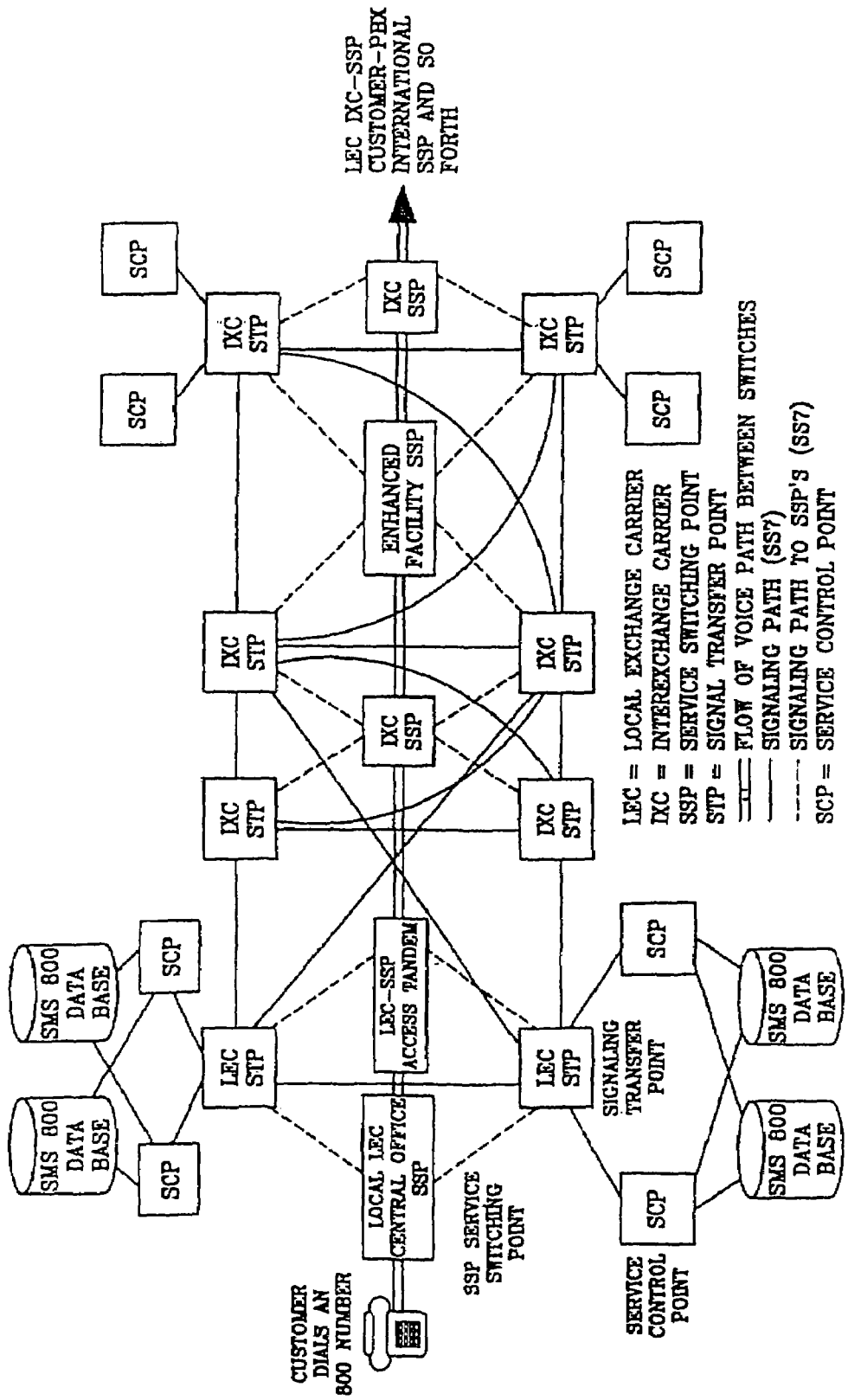

FIGURE 8

EQUAL ACCESS CONVERSION BY REGIONAL BELL HOLDING COMPANY

| | 1984 | 1985 | 1986 | 1987 | 1988 | 1989 | 1990 | 1991 | 1992 | 1993 | 1994 |
|---|---|---|---|---|---|---|---|---|---|---|---|
| Ameritech | 5.5 % | 54.6 % | 80.5 % | 88.2 % | 92.7 % | 95.1 % | 97.4 % | 98.8 % | 100.0 % | 100.0 % | 100.0 % |
| Bell Atlantic | 5.3 | 48.0 | 81.8 | 90.6 | 95.9 | 98.7 | 99.6 | 99.9 | 100.0 | 100.0 | 100.0 |
| Bell South | 5.2 | 60.2 | 72.5 | 85.4 | 93.3 | 96.1 | 100.0 | 100.0 | 100.0 | 100.0 | 100.0 |
| Nynex | 2.9 | 45.9 | 58.2 | 88.2 | 87.1 | 93.4 | 98.8 | 98.2 | 99.4 | 99.7 | 100.0 |
| Pacific Telesis | 0.7 | 44.2 | 75.4 | 93.2 | 95.0 | 92.5 | 97.1 | 99.8 | 99.8 | 99.8 | 99.8 |
| Southwestern Bell | 1.6 | 54.7 | 76.2 | 83.7 | 88.0 | 90.1 | 92.0 | 96.2 | 98.6 | 99.1 | 99.3 |
| US West | 4.0 | 46.7 | 74.8 | 82.9 | 84.9 | 89.8 | 91.8 | 94.5 | 98.5 | 98.4 | 99.8 |
| TOTAL | 3.8 | 50.9 | 74.3 | 84.7 | 91.3 | 94.1 | 96.8 | 98.4 | 99.3 | 99.6 | 99.9 |

CALL PROCESSING SYSTEM WITH CALL SCREENING

This application is a continuation of application Ser. No. 09/573,734, filed May 18, 2000 now U.S. Pat. No. 7,035,384, which is a continuation of application Ser. No. 08/633,507, filed Apr. 17, 1996 now U.S. Pat. No. 5,867,562.

The present invention relates generally to the science of telecommunications. Particularly, the present invention relates to a system for providing screening information about the calling party and/or call origination party. The system uses enhanced network information and/or switch information to select a multi-input template. The enhanced network information and/or switch information in many instances nullifies the importance or relevance of Calling Number (ANI) and Dialed Number (DNIS) in a call processing environment.

BACKGROUND AND SUMMARY OF THE INVENTION

For many years the telephone system in general has known certain information about the phone from which a call has been made. For example, the telephone system has known what area code the call was placed from, the long distance carrier of the phone call, and even the approximate geographic location for a non-mobile phone based on the first six digits of the caller's number. This geographic information comes from the Local Exchange Routing Guide of Bell Core (LERG). However, in reality, the extent of information that has been collected to date about a calling party by the telephone system is quite low. For example, consider a home in which two or more people reside. If a call is placed from that home there is no way of knowing, as the call is handled by the telephone system, who is making the call. The only thing the telephone system may know is the approximate geographic location of a non-mobile phone and the calling number. The call may even have been placed by a visitor to the home.

The examples of lack of knowledge about the calling party quickly expand when one considers phone calls originating from institutions (for example, hotels, hospitals, airports, offices, prisons, universities, etc.). Then consider mobile phones, Personal Communication System (PCS) Service, air phones, maritime phones, and cellular phones, and it soon becomes apparent how little information is really known about a calling party. A public phone (such as a pay phone) in a lobby of an institution, provides little if any information about the calling party especially if the calling party is paying cash for the call.

Businesses have attempted to learn more about a calling party by asking questions of the calling party when their call is received. For example, a rental car company receives a call from a person wanting to rent a car. A live attendant for the rental car company will collect information about the call by asking several questions. Consider that the caller is likely to have rented a car previously from the same company. There should be no need to have to re-ask all of the same questions every time the same caller wants to rent a car. The present invention provides a solution to this and related problems of telecommunications.

The telephone system has evolved to include limited standard identification information about the calling phone (calling number and/or ANI) and the phone that was called (dialed number and/or DNIS). This information is primarily obtained from the telephone number from which the phone call was placed and the telephone number that was dialed by the caller. The telephone system has recognized these two numbers as basic information sources (for routing calls and for billing purposes for example) and has developed a system of standards for the data character fields these numbers are to fill.

The following background information will better explain these standards of limited phone identification used today by the current call processing systems, Interactive Voice Response Systems (IVR), and telephone systems of the United States and foreign countries.

Automatic Number Identification (ANI): ANI is a basic element of telephone calls transported throughout the public and private telephone networks. For the North America Numbering Plan (NANP), ANI is currently 10 digits long. ANI is used extensively for call routing, call billing, call tracking, and call identification.

Call routing has been based on ANI: area code routing based on the calling phone number is a common feature found in most long distance telephone networks. Based on the calling party number (ANI), the call can be routed and/or receive special treatment through use of databases, computer processors attached to and/or available to the telephone switches, the phone network, and equipment. Some Interexchange Carriers (IXC's) (such as AT&T, MCI, Sprint, etc.) and Local Exchange Companies (LEC's) (such as Ameritech) provide many enhanced forms of call routing usually based on the first 3 or more ANI digits.

Call routing based on the first 3 ANI digits is usually referred to as Area Code Routing. For example, if the calling number ANI was 614-847-6161, then Area Code Routing would consider the "614" part of the ANI and route the Ohio originated call using the "614" as the broad geographic data element to start the routing routines and calculations, based on the routing rules and other factors (time of day, day of week, percent allocation, etc.).

Call Routing based on more than the first 3 ANI digits allows for more geographic precision. Most ANI's have a geographic relationship. LERG gives the approximate longitude and latitude for the area code/exchange (as well as other data contained in the LERG) represented by the first 6 digits of the ANI. For example, for the calling number 614-847-6161 the "614-847" component has the geographic representation of Ohio and the metropolitan area of North Columbus/Worthington.

Area-Code-Exchange (NPA-NXX): The Area-Code-Exchange (NPA-NXX) routing ability gives even greater routing definition for the calling party (ANI). If a caller to an 800 number with an ANI of "614-847-6161" was in need of being connected to a towing service, then the geographically closest towing service might be identified to handle the towing job (at a shorter travel time and possible lower cost). Call routing can be based on the first 6 ANI digits or more. In fact, call routing can be extended to the first 7, 8, 9, or 10 digits and can even focus on a single calling telephone number. For example, calls originating from "614-847-6161" could be assigned to a specific travel department within a company. The caller with that ANI could be routed by the telephone network to a certain group that always handles that caller when he dials the local, 800, 500, or other number of a travel agency which routes calls using ANI. In this case, a specific ANI or set of ANI's is given a defined routing algorithm, or treatment, when recognized by a controlling network to route the call based on ANI or a group of ANI's.

ANI used as a billing number and geographic representation: ANI (as a term) is used, quite often interchangeably, for both the call originating billing number and/or the line number for the originating end of a call. For a location that has only one telephone line and one number (such as a residence with only one line), ANI usually refers to both the calling line and the billing number.

For a multi-line location (such as a business or residence with 2 or more lines), a PBX (Private Branch Exchange, a location's switch), or Centrex (where the local telephone company's switch or a separate switch acts as a PBX), the billing number or the lead number may be presented by the public telephone network as the ANI for the actual line used to place the call. For example, for a multi-line location such as a business, the public telephone network may present all the out-bound calls with the same ANI as the billing ANI even though multiple lines are in use, each with their own assigned line ANI and most of which are different than the billing ANI. The billing ANI is usually a good geographic representation of the non-mobile caller and usually represents the responsible (billing) party for the call (or one of them). However, in some cases, the billing ANI may not represent the actual ANI (or line number) of the call. In other cases, the billing ANI may not be presented and the line number ANI is presented instead. In any case, the line ANI or billing ANI do not define 100% of the time who is calling or why they are calling.

ANI is not always a good geographic representation: for example, when a call is routed through a private network before it reaches the "Public Telephone Network", the ANI may have no relationship with the physical location or approximate identity of the caller. If the caller at one location calls through a tie line or on a "Private Network" to another location and then access the Public Network from the second location, the call will probably be identified by an ANI based on the point at which the call entered the Public Telephone Network of the second location. For example, if a caller in Columbus, Ohio accesses a switch in New York City through a private network and then accesses dial tone to reach the Public Telephone Network through the New York City switch, the ANI for the call will most likely be a New York City ANI and the bill will be based on the New York City ANI (distance, identification, location, bill to, etc.)

Billing based on ANI: the caller's ANI (billing number and/or line number) is directly used for billing of calls dialed to:

900 access code type calls (e.g., 1-900-WEATHER);

500 access code type calls (e.g., 1-500 personal communications which currently can be billed to the caller);

10XXX access code type calls (e.g., 10288 where the caller dials an access code to reach a carrier and then dials a number);

1+long distance number type calls per the caller's prescribed carrier; and 411, 1-555-1212 and many other access codes, methods and applications.

The caller's ANI is indirectly (and sometimes directly) used as part of the billing equation for calls where the Dialed Number pays for the call:

collect calls;

1-500 (depending on features);

1-700 (depending on features);

1-800 (e.g., 1-800-SCHERER); and other access methods, codes and applications where the ANI is used, but the caller is not billed for the call (1-800-COLLECT, 1-800-CALL ATT, etc.).

For 1-800 access code calls, the caller's originating ANI is used to control some of the billing decisions—for example:

Intra-state;

Inter-state;

origination from a different country or island (e.g., calls from Canada);

time zones; and mileage between calling parties and mileage bands.

1-800 access service was introduced by AT&T around 1967. From that time on, the caller's originating ANI became an integral part of the billing, routing, and call detail. 1-900, 411, and other pay-per-call numbers have also been around for 15 or more years and use the caller's originating ANI for part of the billing and routing equation.

Call tracking: ANI, along with Dialed Number including date and time, may be used as an approximation to track calls. However, if two callers dial from a PBX with a common billing ANI at the same time to the same multi-line location and both callers hang up at the same time, 2 call records will be created that look the same (even though there were 2 calls). Caller ANI, even with Dialed Number, date, time, and duration, do not provide exclusive call tracking, nor specific information about who was calling.

Presentation of network data and/or switch data: most advanced PBX's, ACDs (Automated Call Distributors), network transferring features (such as AT&T's Transfer Connect), PBX call transferring, and other forms of call switching and call transferring—preserve and transfer the caller's ANI (if possible) in the transfer of a call. This is done to preserve this piece of network provided data to the next call location, in an attempt to better serve the caller, and to help identify the caller for billing purposes. ANI preservation and passing has been a feature of Computer-Technology Integration to manage calls.

Caller ID (ANI): one of the most widespread and well-known uses of the caller's ANI is Caller ID (Caller Identification). The concept of Caller ID is to pass on to the recipient of the call the ANI of the caller before the call is answered. ANI has been a key component of ISDN (Integrated Services Digital Network) defined by the CCITT in the 1970's. The caller's ANI has traveled the phone network since the 1970's, if not earlier, in the form of two products:

1) 1-800 Access Type Service; and

2) Integrated Services Digital Network (ISDN Service).

Many companies, businesses, and individuals use ISDN, digital access, and/or Caller ID to get certain data elements of the call—one of which is caller ANI. Despite the benefits of ANI, caller ANI does not define the actual calling person. It does not indicate why the caller is calling.

The ANI of the caller is preserved and passed on as the call passes through the Public Telephone Network (and usually the Private Telephone Network, if possible). For example, the caller ANI may traverse through the LEC, IXC, CAP (Competitive Access Provider), PBX, ACD, Agent and so forth, so the final recipient receives the caller's ANI (i.e., caller ID).

Dialed Number: Dialed Number is the number that the caller dialed. Dialed Number, like ANI, must comply with the North America Numbering Plan (NANP) and the CCITT International Standards if the call is to originate and use the public switched telephone network of the U.S.A., Canada, North American (NANP) and international locations.

Examples are:

| | |
|---|---|
| 847-6161 | 7 digit dialing within the Local Access and Transport Area (LATA) where the area code is assumed to be the same as the local area code (i.e.: 614). With multiple area codes for the same LATA coming into existence, 7 digit dialing will be phased out in some areas to 10 digit dialing. |
| 809-776-8500 | These are examples of 10 digit dialing geographic |
| 614-847-6161 | numbers. The 809-776 indicates a phone number in St. Thomas, a U.S. Virgin Island. |
| 1-800-356-6161 | These are all examples of non-geographic routing |
| 1-900-932-8437 | numbers where the carrier and/or telephone network |
| 1-500-422-7537 | that has handled the call checks a database for the |
| 1-700-328-5000 | designated termination and associated routing. |
| 911 | These are examples of local special purpose Dialed |
| 411 | Numbers that again have specific routing and |
| "0" | geographic assumptions. |
| 011-44 | International Dialed Numbers that start with |
| 011-72 | international access, country code, and then the number (city, line, etc.) in the designated country. |

For North America and the countries (including the U.S.A.) which are using the NANP, the public switched telephone network requires the Dialed Number to conform to the NANP. The Dialed Number is passed on to each successive party of the transport of the call (LEC-IXC-LEC-PBX-ACD- etc.) so the call can go through the telephone network ultimately being routed to the intended destination and for call accounting purposes.

Dialed Number and DNIS: the Dialed Number Identification Service (DNIS) is a shortened presentation form representing the Dialed Number. When the incoming call is terminated on digital access (and other forms of special access), the transport provider will usually offer DNIS to help identify what number was dialed for an incoming call, to the target telephone equipment and location. If the Dialed Number was, for example, 1-800-356-6161, then 6161 may be sent with the call presentation to reflect the 10 digit number dialed to give special treatment, routing, and information for the incoming call. The DNIS assigned could be from 1 to 10 digits or more (but usually not more than 10) and does not have to be the same as, or part of, the Dialed Number. In the above example, for the 800 number 1-800-356-6161, the DNIS could be, for example, "100" or "2" or the number itself.

Uses of DNIS: a common use of DNIS, besides representing the Dialed Number, is to aid in routing the calls within the telephone equipment so multiple different Dialed Numbers can share a common access trunk group and a common routing and still receive selective routing and unique audiotext greetings and selective handling. For example, within a business one 1-800 number may route to sales while a different 1-800 number for the same company routes to customer service, but calls to both numbers share the same or parts of the same trunk group to improve network access, switch and telephone equipment utilization.

Geographic Dialed Numbers: for the traditional geographic Dialed Numbers, such as 411, 911, 614-847-6161, the public switched network will attempt to deliver the call to a primary location, and if the local phone company and/or the IXC offers advanced features (Call Forward on Busy, Call Forwarding, Call Forward on Ring No Answer, and other possible static and dynamic delivery options), the call can have special "pre-designated routings" that are mostly static in nature.

Non-geographic Dialed Number: for non-geographic Dialed Numbers, such as 1-800, 1-900, 1-500 (PCS Follow Me), Cellular, and other non-geographic Dialed Numbers, the routing is controlled by the local access provider (LEC) accessing local databases to hand the call to the appropriate IXC (interexchange carrier) for providing inter-LATA (and intra-LATA) services and network routing. It utilizes the traditional public telephone network supplied ANI plus Dialed Number(s) as key data elements.

Network data and/or switch data: in both cases (geographic and non-geographic Dialed Numbers), the telephone network currently uses the public network supplied ANI and/or Dialed Number to determine call routing and special call treatment. Both the ANI and Dialed Numbers are fixed or static in nature, and are located in pre-designated fields of the actual call data. The USA Network and Many International Telephone Networks Support CCS7 Signaling.

Network data and/or switch data flows over a separate signaling network: a CCS7 (Common Channel Signaling 7) network consists of nodes called Signaling Points (SP's). Unique point codes for each network SP serve as the address for message distribution. A typical CCS7 network (as referenced in FIG. 7 herein), has three key nodes:

a Service Switching Point (SSP) capability at a central office provides CCS7 trunk signaling and/or queries a database to determine call routing;

Service Control Point (SCP) houses a database with the routing information used by network SSPs; and a Signaling Transfer Point (STP) provides routing capabilities for CCS7 messages between CCS7 nodes.

The North American network is based on the basic "Mesh" structure. This structure is sometimes referred to as the "Quad" structure.

The hub of the network is STP pairs. These are two separate STP nodes operating together in a logical arrangement for redundancy.

The Signaling Links can be categorized into several types depending on the functions being performed. However, regardless of the function being performed, all Signaling Links operate in the same manner and have the same technical requirements.

A-Links (Access Links) are used to allow SSPs, SCPs and SPs to connect STP nodes. B-Links (Bridge Links) are used to join mated STP pairs to other mated STP pairs. These Links form the Quad structure, which will provide complete STP redundancy.

C-Links (Cross Links) are used to interconnect two STP nodes, in order to create an STP pair.

D-Links (Diagonal Links) interconnect primary and secondary Signal Transfer Point pairs. They provide communication between pairs and serve as an alternate routing path. A two level hierarchy is an extension of the basic mesh structure.

Some networks, typically those with high levels of sub-network traffic volume, may require another level of STP pairs. This Primary level of the STP architecture would also be a convenient place to bridge signaling boundaries (i.e. from one operating region to another). Most CCS7 nodes will be connected to the network at Secondary level STP pairs, except SCPs may be connected at the Primary level.

D-Links (Diagonal Links) are used to form connections between Secondary level mated STP pairs and Primary level mated STP pairs. This forms a Quad structure as well.

The CCS7, SS7, ISDN networks have predefined fields that contain:

1) The Dialed Number;
2) The Calling Number; and
3) Enhanced Data About the Call.

This network call data travels through the signaling network and represents the call and is presented to the call processor as the IAM (Initial Address Message) that defines the in-bound call to the call processor as part of ISDN, SS7 and CCS7 messages.

Private networks (on-net): "On Net", a Private Virtual Network term, represents a dialing plan that may or may not conform to the public switched network. AT&T in about 1985 introduced its Software Defined Network ("SDN"). MCI offers Virtual Private Network ("VPN") and others offer private dialing plans (e.g., switch to switch) that may not conform to the public network. These private telephone networks are under computer control with access to databases so as to receive calls over dedicated and special access lines or trunks and may use unique "Dialed Numbers" that may look like public Dialed Numbers. The private numbers are translated and routed differently (or can be routed the same) as the public network. For example, dialing 1-614-847-6161 on a private telephone network could ring to a phone in New York City (or anywhere) instead of the expected geographic location of the Columbus area in Ohio.

New network data and/or switch data elements—II digits: Information Indicator Digits, (also referred to as "II digits" "info-indicator digits", info-indicator (II) digits, and/or ANI Information Digit Codes) Bellcore Local Exchange Routing Guide, Dec. 1, 1995, Section 1, Page 168 (1.8 Automatic Number Identification (ANI) Information Digits Codes) are two-digit codes which precede the 7 or 10 digit number of the calling line (ANI) and inform the users of Network Information, the local LEC, Interexchange Carriers and others about the "type of line" that is originating the call, any special characteristics of the billing number (ANI) and/or certain classes of services. The two-digit II digit codes are part of the signaling protocol generated in equal access offices, which represents approximately 99% of all public U.S.A. calls by January 1996 (calls that originate by accessing a local phone company access line such as 1-800 type calls for the U.S.A.) (See FIG. 8). The II digits provided information about the ANI to aid in special routing and billing decisions regarding the ANI for those parties that may handle the call. II digits are designed to help define the "type" of line the ANI represents that is placing the call.

II digits are assigned by the NANP Administrator, at Bell Communications Research, Inc. (Bellcore) based on the telephone industry's needs to classify types of call origination for specific applications and needs. Some of the key II digits codes (00–99) are as follows:

Code 00—Plain Old Telephone Service (POTS)—non-coin service (not a pay phone), no special treatment required, (an unrestricted line).

Code 01—Multiparty Line (more than 2) the ANI does not really reflect the calling party, the party will need to be queried to determine the real calling number (ANI).

Code 02—ANI failure, the calling station has not been identified, the calling party will need to be queried to determine the real calling number (ANI).

Code 06—The call is coming from a multi-station location such as a hotel or motel and the IAM does not include the room number or account number of the caller, just the hotel/motel's ANI.

Code 07—Special Operator Handling Required—Calls from "07" require further operator screening to check to see if the call is allowed.

Code 20—When a call originates from a PBX and the main billing number is being sent as the ANI instead of the individual line number, II digit code 20 is sent with the ANI.

Code 23—Gateway type calls, where the ANI being sent does not represent the real calling line number, such as:
non-equal access end offices
0-800 (data base access)
Type 1 cellular calls (identifies the cellular system—not the caller)
calls from PBX trunks
calls from Centrex tie lines
Code 27—Coin or pay phone.

Code 29—Prison/inmate service—a confinement/detention facility; where calls must be screened for outward calling use and only collect billing is allowed. (ANI of caller can not be billed).

Code 30—Unassigned calling ANI.

Code 31—ANI that has been manually placed in trouble-busy state by Telco personnel.

Code 34—Telephone operator handled call, the call has been handled by an operator prior to reaching the called party. (For example: caller could not get through, required operator assistance).

Code 52—Outwats calls limited to certain zone(s) or band(s) on a special billing arrangement.

Code 60—The call is a TRS call that came from an unrestricted line and the ANI represents the billing line.

Code 61—Cellular/wireless PCS (Type 1)—The ANI represents the system, not the mobile directory (Caller's number) placing the call.

Code 62—Cellular/wireless PCS (Type 2)—The ANI does represent the caller's number (mobile directory number) placing the call, but the ANI does not represent the true geographic location of the caller (the caller is in their home zone (extended)).

Code 63—Cellular/wireless PCS (roaming)—The ANI identifies the mobile directory number (Calling Number) but not the geographic location (since the Caller is roaming).

Code 66—Call originated from a hotel/motel through use of a TRS provider.

Code 67—Call originated through use of a TRS provider and the ANI is restricted (such as a pay phone).

Code 70—ANI is that of a private pay station (coin and/or coinless), for example Public Access Line (PAL), Customer Owned Coin Operated Pay Telephone (COCOT), etc.

Code 93—Call originated (ANI) from a Virtual Network type of service (such as an IXC Calling Card), no real knowledge on the ANI.

As it can readily be seen, the II digits provide a wealth of knowledge about the calling line before, during, and after the call is answered. The II code of "00" represents an unrestricted home or small business (no PBX); while "29" represents a prison/inmate facility; while "27" is a coin/pay phone; etc.

The II digits are presented with the other network data and/or switch data through use of ISDN and/or SS7 signaling and/or can be provided as part of the inband data stream where available.

Database data about ANI, provided by the LERG: "NPA-NXX Type"—LERG reports on how and where the first 6 digits of the 10 digit North American Numbering Plan will be used and how it will be assigned by Bell Core. For example:

614-847-XXXX Represents Plain Old Telephone Service and/or business line with a geographic location of Columbus, Ohio.

614-755-XXXX Represents a pager exchange assigned to the Columbus, Ohio area (ignoring roaming).

614-361-XXXX Represents a cellular phone exchange assigned to the Columbus area (ignoring roaming).

The first 6 digits of the 10 digit NANP is usually referred to as an exchange, of which there are tens of thousands that have been assigned and/or issued by Bellcore as part of the NANP. Each exchange is also assigned a category or "NPA-NXX Type" such that all 10,000 numbers of the exchange have the same type usage.

In the Pager Example:

614-755-XXXX Represents an exchange or NPA-NXX (614-755) such that all 10,000 numbers having this prefix have been assigned for use as pagers.

The number ranges (614-755-0000 through 614-755-9999) or all 10,000 numbers are reserved for paging. If the exchange 614-755 is checked in the LERG "NXX Type" the value of "02" will be found "fully dedicated to paging".

Some more important examples of the "NXX Type" as defined by the LERG for entire exchanges are:

NXX-Type Code 00—Regular (Plain Old Telephone Service) POTS

NXX-Type Code 01—Mobile (Improved Mobile Telephone Service) IMTS

NXX-Type Code 02—Fully dedicated to paging

NXX-Type Code 04—Fully dedicated to cellular

NXX-Type Code 06—Maritime (Ship to shore, ship to ship)

NXX-Type Code 07—Air to ground

NXX-Type Code 10—Called party pays

NXX-Type Code 14—Special calling cards

NXX-Type Code 16—Originating only (can not receive calls)

NXX-Type Code 64—Personal Communications Services (PCS)

NXX-Type Code 88—Toll station—ring down

Many of the codes not listed above (but all are included in the attached LERG reference) are related to special mobile, paging and cellular and LATA limitations.

Given the first 6 digits of the calling number (ANI), and with the "NPA-NXX Type" classification provided by the LERG reference, the basic phone classification can quickly be determined, for example:

07=Air to ground
00=Plain business/residential
04=Dedicated to cellular

Sometimes the Dialed Number is all that is needed as the unique key to information: in Columbus, Ohio, since about 1985 the city trash collection has divided the city into 5 colors. When you move into a residence in Columbus, Ohio, you learn your trash color. Each trash color has a unique phone number to call to learn when your color's trash will be picked up. Because of snow, cold days (below zero), and holidays, the status of trash pickup changes daily. For a GOLD coded trash customer to find out the current status, they call 614-645-GOLD, and the PINK coded customers call 614-645-PINK, etc. The city of Columbus uses the dialed number to deliver current status of trash pickup, to the 5 subsets of the City's residences. (614-645-RUBY, PINK, GOLD, GRAY, NAVY).

LEC database about ANI on-line (LIDB): all of the local phone companies participate in a U.S.A. and Canadian database called LIDB (Line Information Database). LIDB represents virtually all phones in the U.S.A. and Canada for the reasons listed below. LIDB is really a collection of large LEC's (such as GTE), regional Bell operating companies (such as NYNEX) and a few centralized databases (such as ITN, etc.) who represent large groups of small phone companies. Companies such as Card-Tel provide coordinated access to these sub-sets of LIDB that provide a uniform access method and a uniform response back from the LIDB databases. The maximum response time to a LIDB inquiry is usually less than 1.0 seconds, and this inquiry is based on the "ANI" of the Caller and/or can also be the Dialed Number if the Dialed Number is also a POTS' (Plain Old Telephone Service) number.

A new feature of Caller ID in the December, 1995 time frame is the Caller's name as it would appear on the phone bill. The Caller's name along with the Caller's phone number (calling from number—ANI) is presented to the called number as part of Caller ID. The Caller's name is now available (on a national schedule) as a new feature of LIDB for all POTS lines and other lines (business, hotel, motel, residential, unlisted, pay phone, etc.) for all of the U.S.A. and Canada.

The Caller's name is available, even if the Caller's line (ANI) is unlisted or unpublished through the use of LIDB. Whether the Caller's name can be given out for display on a phone involves intrastate and interstate privacy laws and codes.

In many cases, ANI must be checked to restrict services: the ANI of the Caller also determines the Local Exchange Company (LEC) assigned to the ANI. Currently, exchanges are assigned to a LEC, usually in whole blocks, such that for the 10,000 number exchange 614-847-XXXX, all 10,000 numbers (614-847-0000 to 614-847-9999) are assigned to Ohio Bell of Ameritech for assignment to customers, routing to the end phone and/or device (phone, pager, PCS, etc.) and billing to the customer for usage changes (1+calling, international calling, 411 calling, 1-900 calling, etc.).

To provide enhanced and/or standard local and long distance phone service, the ANI must be a billable ANI. Some normal ways of checking for a billable ANI are:

1) Based on LIDB, is the ANI valid?

2) Based on LIDB, is the ANI billable for the phone service (for example, will the ANI accept a collect call)? The call processor and/or switch and/or SCP must access several more types of databases:

a) Does the enhanced service provider (IXC) have a billing and collection agreement with this LEC for this ANI? This would come from a database maintained by the enhanced service provider, third party, IXC, etc.

b) Most business, as well as all pay phones have their "ANI" marked as "no collect calls". This is why an operator or an automated collect service (such as 1-800-collect) will tell you that the number you are calling will not accept "collect calls". The collect call service (automated or live operator) will check the actual LEC database (usually through the use of LIDB) and will receive an automated response code back that the "ANI" in question will not accept "collect calls".

c) Has the ANI, LEC calling card, other Bill-to number (credit card), other billing or account number, or grouping of account numbers (household, etc.) exceeded a service provider's velocity threshold for a time period ("X" dollars in "Y" time)?

d) Based on customer preference, prior customer service with a customer, and advanced features with a customer, a customer will not want to pay for this type of service for this time period (for example: no collect calls between midnight and 6:00 A.M.).

e) LIDB may also be used to validate a LEC calling card. LIDB provides on-line access to the calling card a LEC assigns to a POTS number. When you are away from your phone—you can bill calls to your (home) phone through use of your LEC calling card number. One of the means for validating this calling card number is through the on-line use of LIDB. For example: at a pay phone, if you wish to bill a phone call to your LEC calling card, the calling card you would enter at the pay phone would usually be validated through LIDB.

Future use of LIDB—one of the planned possible future uses of LIDB is who is "your local LEC". With the possibility of local number portability, LIDB could be used to determine who the local LEC is, to then determine who to route the call to for the last mile so the phone will ring.

ANI and Dialed Number part of billing: the billing and reporting function of telephone calls (such as MCI's "Friends and Family") revolve around databases, restrictions, rates, and relationships of data ($ dollars spent in a time period such as AT&T's "True Rewards"). Billing databases, usage, access, and restrictions have been part of the phone network since before the AT&T break up in 1984.

Prior Knowledge: prior knowledge is provided by ANI, for example, as it:

a) Relates to billing and/or usage:
  i) Call velocity—the past number of calls over different periods of time (current day, week, month, 45 days, year, etc.):
  ii) Dollars billed and billing velocity—the amount of billing transactions and dollars billed by the biller and/or service provider, bureau over different periods of time to be used to control credit decisions;
  iii) Customer service and satisfaction—services the customer will not pay for or has a tendency to refund and/or the party who is assigned the ANI or billing identifier wants blocked.

b) As it relates to prior calls and/or selections:
  i) Score or level attained in a program, event, promotion, or several programs;
  ii) Level of proficiency or approximate knowledge attained based on ANI, Caller Identifier, or real identity (for example—based on Social Security Number).

c) As a method to control entry into the particular program or restrict entry based on prior usage identity and performance.

The present invention brings certain telephone network data and/or switch data into the field of call processing in unique ways to provide a new call processing system and reveals several methods of using such data to better serve callers and to provide entities who rely on callers for business a better means in which to handle those callers. The present invention recognizes deficiencies in the use of calling/billing line number (ANI) to identify a caller and/or call. The use of calling/billing line number does not indicate the actual identity of the caller. Furthermore, the Dialed Number does not always indicate the specific purpose of the call and the best way to always answer the call. ANI and Dialed Number when used for call processing purposes, can provide misleading information.

The present invention is a new, unique, and much needed call processing system that provides substantial benefits over the traditional use of limited network data and/or switch data, such as Calling number (caller ID and/or ANI), Dialed Number (and/or DNIS), and Equipment type (touch tone, rotary, data). The known, limited network information can lead to less than accurate call limitation, statistical analysis and unique caller input format selection. As stated above, known use of telephone network data and/or switch data is very imprecise as to whom is calling. To limit the callers or select caller input templates and caller data request selections based on ANI, Dialed Number and/or equipment type will not give proper representation to businesses, schools, PBX's, and/or hotels with thousands of rooms, or cellular/PCS type 1, for example, where all 10,000 ANI's are the same and represent the system not the mobile ANI. For example, a TV ad offering a free breakfast for Father on Father's Day, shown in Orlando, Fla. would draw hundreds or even thousands of calls from the same small group of ANIs, in this case hotels. The call processor, using known methods, would be able to gather little valuable information based on ANI in this case.

Businesses, hotels, pay phones, PBX's, college phone systems, and other large gateways must be recognized and taken into account in any statistical analysis using ANI and Dialed Number as call limiters and call input selections. Fortunately, using call enhanced network data and/or switch data such as described herein, will change the caller input data selection and improve the call prompting and call handling by the call processing system and, in many cases eliminate or enhance the value of ANI.

Enhanced Data Available as Part of the Call Processing of the Present Invention

| | |
|---|---|
| II Digits | info indicator digits - indicate phone type (pay phone, residence, business, prison, etc. |
| NPA-NXX | LERG Exchange Assignment - use classification for the entire exchange (such as air to ground phones) |
| LIBD | Line Information Data Base (ANI for all NANP) caller's name line restriction line service change of ownership |
| Private Database | business vs. residence street address ZIP code Social Security Number if residence |
| Change of Ownership | indicates the historical ANI data is no longer relevant due to change in ownership |
| Line Status | based on the in-bound and out-bound lines available, the call handling logic will change. |
| Call Control | based on the resources available to the call processor. |

A preferred embodiment of the present invention is useful in a multi-line, multi-protocol, multi-format, multi-input template call processing system. It utilizes the following:

a) Public and Private Phone Network supplied data and/or switched supplied data b) Caller inputted data without prompting;

c) Caller prompted by the call processor to input data (information)—as the data may be needed one or multiple times which consist of multiple data items using multiple input formats and templates tailored based on stored data, network call information and data inputted;

d) Caller responding to the call processor requests, and inputting data as needed via touch tone, pulse dial, voice recognition, word spotting and/or voice prints, and electronic data in conjunction with voice (for example, data over voice, ADSI, etc.);

e) Proper call routing, as required, after the reason for the call and/or identity of the caller has been sufficiently determined;

f) Proper call identification as the call is passed on to the next call handling location—whether live and/or automated;

g) Access to stored data to control, identify, modify, route, rate, tax, compare and process the current call;

h) Updating stored data to currently (real time) and historically track what transpired, to provide information to other locations who may be still processing the current call, to provide future treatment of the same caller(s) or new caller(s) to the same Dialed Number and/or other Dialed Numbers, to aid and provide telephone related services, customer services, information to customers, to respond to customer queries and the sale and use of products and services, and other services and products and to aid and develop billing and reporting data;

i) To record words, inputs, opinions, feelings, desires, knowledge, experience, and other data from individual callers and/or a selection of callers that are processed as part of the call, once and multiple times, during and/or after the call, that could affect the next caller to same Dialed Number or a set of related Dialed Numbers and/or other Dialed Numbers, after all the calls over a period of time, (such as a statistical analysis), and on a rolling basis with each sub-set of callers to select a further set.

The present invention uses twelve (12) relatively new technologies and concepts individually and in combination with existing technologies to provide enhanced call processing. The twelve (12) new technologies for use in call processing environments, of the present invention, are:

1) II digits—info indicator digits that are now part of the SS7 (Signaling System 7) and/or ISDN (Integrated Services Digital Network) that provides ANI definition and restriction information for each phone call (see Bellcore documentation for II digits, SS7, and ISDN documentation) and define phone type—business, residence, pay phone, institution, local only, etc. for each call.

2) NPA-NXX type (reference LERG, the first 6 digits of all North American Numbering Plan (NANP)) defines ANI digits into a fixed classification (pagers, cellular phone, air to ground, POTS, etc.).

3) ADSI—Analog Display Serial Interface phones—and other data with voice over the same call (voice/data modems, ISDN, BRI, etc.) where data and voice coexist at the same time, or different times, over the same voice path of the call: this allows the call processor to create displays and soft key(s) on the caller's terminal (PC, ADSI phone, Kiosk, etc.) and to accept voice, soft keys (keys defined for just that display), data input-keyed data, screen touch data input, touch tone and voice recognition and voice print inputs; all intermixed at the caller's and call processor's discretion.

4) Line Information Data Base (LIDB): the local phone company's customer data base is on line and available for real time access (USA and Canada) to determine
 a) Is the ANI valid (turned on);
 b) Validate the LEC calling card PIN; and
 c) Restricted ANI services (no collect call, for example).

5) Caller's Name—As an implementation of caller ID, the billing name is available for the USA and Canada on a real time basis. This is a new special feature accessed through LIDB in the January, 1996 time frame.

6) Access to information, public and private databases that are keyed by a code contained in the call data (e.g.—ANI): one existing database has the phone type for example—business versus residential for 85–90% of all phones in the USA and Canada, both listed and unlisted, with Zip code and street address, again on-line and indexed by ANI for 85–90% of the USA and Canada.

7) Access to information that is keyed to a unique number or reference that is not a part of ANI—such as Frequent Flyer Number, account number, customer specific keyed such as a ticket number, Social Security Number, credit card number, sweepstakes number, or other unique key for the service, product or event.

8) Biller's databases by ANI and/or NPA-NXX; whether the call can be billed by one or more billers.

9) Prior knowledge by ANI and/or other unique identifier such as credit card number as it:
 a) Relates to billing and/or usage:
  i) Call velocity—the past number of calls over different periods of time (current day, week, month, 45 days, year, etc.);
  ii) Dollars billed and billing velocity—the amount of billing transactions and dollars billed by the biller and/or service provider bureau over different periods of time to be used to control credit decisions;
  iii) Customer service and satisfaction—services the customer will not pay for or has a tendency to refund and/or the party who is assigned the ANI or billing identifier wants blocked;
 b) As it relates to prior calls and/or selections:
  i) Score or level attained in a program, event, promotion, or several programs;
  ii) Level of proficiency or approximate knowledge attained based on ANI, Caller Identifier, or real identity (for example—based on Social Security Number).
 c) As a method to control entry into the particular program or restrict entry based on prior usage identity and performance.

10) Change of ownership and/or status—using the ANI "Bill To" name (caller ID name): if not available then accessing other commercial Bill To" name and address databases or other information other than LIDB to use as the equivalent to caller's name and storing the "Caller ID" name for reference.

a) The system can be checked based on a date and/or "last called" usage and/or other frequency triggers to see if the "Bill To" or other stored data as required has changed for a given ANI. If the "Bill To" (or other data) has changed (through LIDB, presentation of the call, etc.), clearing out, resetting and/or modifying prior stored data to a history file (if so elected to save) and resetting or modifying the current stored data to reflect the new "Bill To" (or other data).

11) User-to-user data passed through the IAM (Initial Address Message) of the incoming call: "User-to-user" data is a field in the IAM (up to 255 characters long) that can pass additional data about the call with the presentation of the call.

12) "Line Status" and/or "Call Control" of the Call Processor: in-bound to and out-bound from "line Status" of the call processor is a major element in determining the actions of the call processor. As the in-bound lines to the call process reach 100% utilization (i.e. 190 lines in use of 200 available (95%) utilization), the call processor may start refusing, rejecting, and/or shedding in-bound calls based on priority. The same is true with out-bound lines from the call processor to other devices such as lines to a conference bridge, ACD, live agents, text to speech or other custom platforms, On Net-to-On Net, another switch or network. Based on the almost full status (up to 90+%) or full or even over-full; the call processor is holding callers in que in excess of the capacity of the next destination of the call; the call processor may start to reject, refuse or shed in-bound calls based on the anticipated destination of the calls. Give the in-bound line status and/or out-bound line status of the call processor plus network data about pending calls, the call processor will use the "Line Status" and/or "Call Control" to change the acceptance and processing of calls.

BRIEF DESCRIPTION OF THE DRAWINGS

FIG. 2 shows a voice/data call path of an example call using the system of the present invention;

FIG. 3 shows one preferred embodiment of a call processing architecture for use with the system of the present invention;

FIG. 4 shows a second preferred call processing architecture for use with the system of the present invention;

FIG. 5 shows a third preferred call processing architecture for use with the system of the present invention;

FIG. 6 shows a call processing network for use with the system of the present invention;

FIG. 7 shows a more complex call path, as an example of a call that may incorporate the system of the present invention;

FIG. 8 is a chart of equal access conversion by telephone companies, which evidences the broad availability of network data and/or switch data that is used in the system of the present invention.

The following three Bellcore documents are hereby incorporated by reference herein:

a. Local Exchange Routing Guide, general information, Section 1, pages 168–173, Dec. 1, 1995;

b. V&H Coordinates Data, Data Set/File Specifications, pages 1–5, Jan. 15, 1996, with Appendix A-1, pages 1–6, Jan. 15, 1996; and c. Generic Requirements For Call Control Using ISDNUP, GR-317-CORE, Issue 1, February, 1994, Appendix A: SS7 Messages and Appendix B: SS7 Parameters.

DETAILED DESCRIPTION OF PREFERRED EMBODIMENT(S)

Figure 1A:
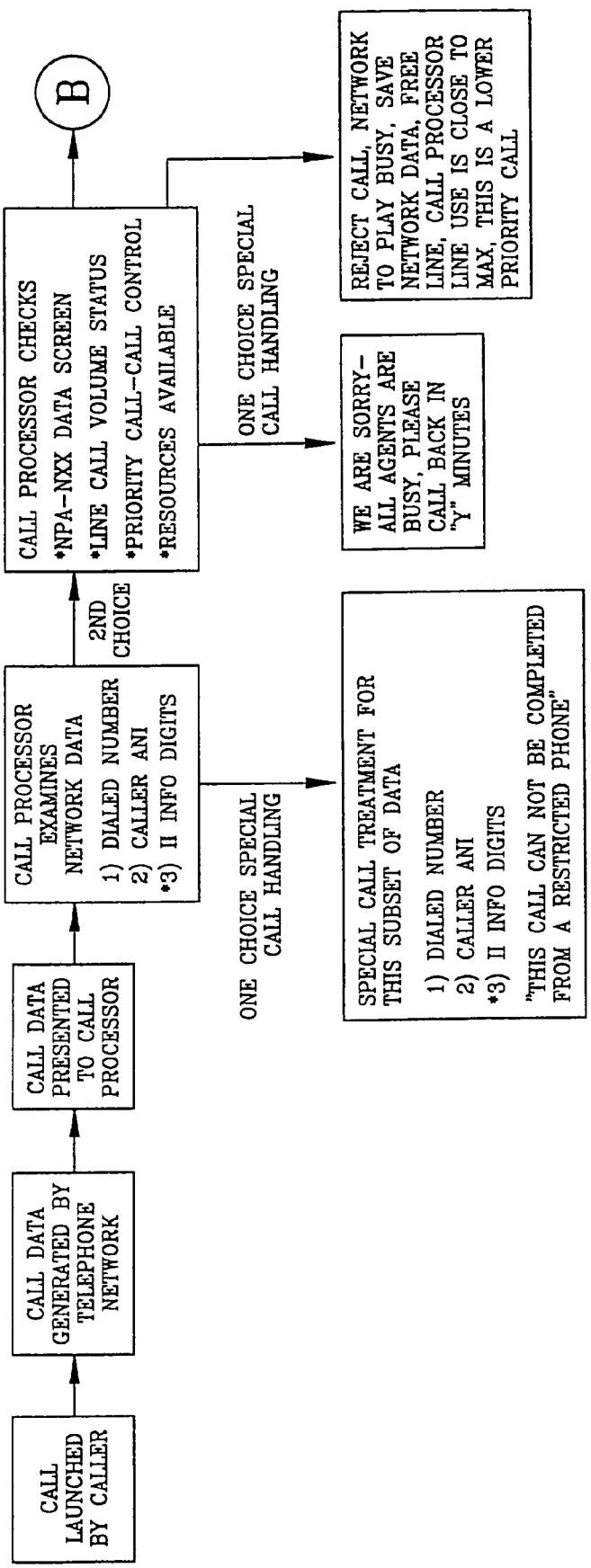
FIG. 1A–1B shows a flow chart of one preferred embodiment of a system for call processing of the present invention.
Figure 1B:
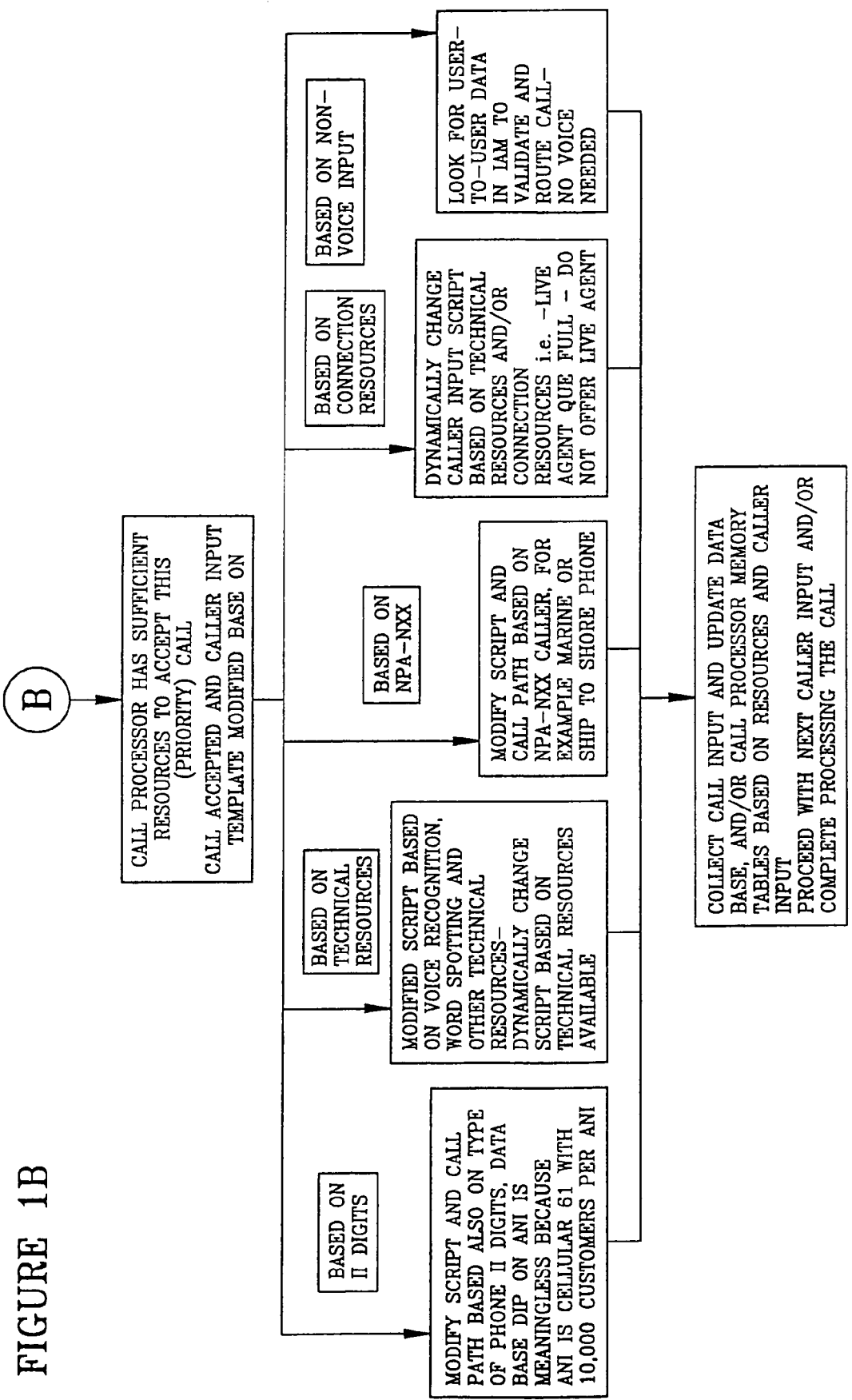

Referring now to the drawings, and particularly FIGS. 1A and 1B, the present invention provides superior call processing capabilities based on the information that flows with the call, such as, II Digits and prior knowledge about the call and/or the caller. Thus, the call is routed and/or answered more specifically than a generic "Hello". One objective of the present invention is to greet the caller through the use of different and multiple scripts and data collection formats based on as much knowledge as possible, to interact with the caller through one or more of the following:

1) ADSI (data with voice);
2) Touch tone;
3) Dial pulse;
4) Voice recognition/voice prints;
5) Other audio and/or data inputs; and/or
6) Live agents and/or automated agents to accurately determine from the caller: the true identity of the caller (e.g. account number, Social Security Number, etc.) to the extent needed or available; and/or the specific reason, action, service, product or information needed by the caller for this segment of the call to the extent needed or available; and/or collect other caller input, priority, data, or information that the caller can provide through the use of live and/or automated agents and/or IVR technology and/or data with voice, to the extent needed or available.

For example: if a caller calls an Airline's main reservation number:

a) The Dialed Number indicates the main number for reservations for the airline.

b) The NPA-NXX type code for the ANI of the call indicates that the caller is calling from an air phone.

c) Based on ANI, the Airline's call processing system recognizes, through prior knowledge, that ANI for the air phone is assigned to one of the Airline's competitor's planes and through checking "change of ownership", the call processor determines that the ownership of the ANI has not changed.

Then, instead of the standard greeting for call processing, the call is given an appropriate greeting, for example "Dear X Airlines passenger, thanks for calling Y Airlines", and is assigned an extremely high priority to get the caller to a live agent by the first ring.

II digits may, as part of the present invention, be considered first in time by the call processor to determine the relevance of other network data and/or switch data associated with the call, and based on II digits, no other network data and/or switch data may even be relevant.

Given the "Calling Line Type" knowledge provided by II digits, the multi-line, multi-protocol, multi-greeting (customized greetings based on knowledge) call processing system will provide better and more accurate call treatment.

Through the use of the "NXX type" as defined in the LERG, based on the exchange or the first 6 digits of the ANI, special call handling can be provisioned. For example, maritime and ship to shore phones may be routed directly to an agent, because of the cost per minute to the Caller and the quality of the call and possible lack of touch tone quality; the Caller's desire to keep the call as short as possible, voice quality of the connection, and that the phone and/or boat could quickly get out of range.

If the application was going to ask the Caller for a phone number to call the Caller back, due to lack of operators, based on NXX-type this option to offer to call back would work best for NXX-type "00" plain old telephone service and the call back would not work for NXX-type "16" originating only, since the phone calling could not be called back (such as a pay phone). The use of exchange classification "NXX-type" in a call processing environment provides better call processing to the Caller and thus better service to the Callers.

LIDB is a nationwide (U.S.A.) and Canadian standard to provide POTS number validation and POTS number information access. "Caller ID Name" is a service provided by LIDB. In summary, in the past LIDB was used for billing purposes "that is—can the call be billed to this number, is the number in service, will the number accept a collect call, validation of the calling card number assigned". However, the present invention uses LIDB in a call processing program. For example a caller may hear the words "in order to validate that the ANI you are calling from is yours, please enter the LEC calling card for the ANI you are calling from at the tone . . . . " Only a member of a household would likely know the LEC calling card for the household, similar to the 4 digit ATM PIN for a credit card or debit card to again prove knowledge of ownership.

The present invention has incorporated this new LIDB feature into a unique audio-text and/or call processing program. Here are but two (2) examples of embodiments of the present invention:

a) ANI Validation—Asking the Caller to spell the last name of the owner of the ANI and comparing the spelling given by the Caller to that spelling provided by LIDB.

b) "Change of Ownership" Somewhere between 20–25% of the ANI's change ownership each year. With one embodiment of the present invention the call processor determines that the ownership has changed from a prior call to the current call—through the use of a change in "Caller's Name" (through LIDB and/or equivalent data through other services). The call processor collects the "Caller Name" as a condition in the call processing flow and stores the LIDB "Caller's Name" as a data element related to the ANI of the Caller (as well as II digits, NXX-type, Caller inputs, date of last call, and other data items as necessary). On a subsequent call, the call processor can again retrieve the "Caller's Name" from LIDB (or the equivalent) and perform an exact comparison to check to see if the "Caller's Name" has changed. If the "Caller's Name" has changed, then all the prior stored data that may be ANI related is no longer valid and new ANI specific data will need to be collected from the Caller, through use of different input and data collection templates, and/or through use of the IVR, voice recognition, data input, live agent, etc.

Change of ownership does not need to be performed on every call. Change of ownership is a function of how frequently the Caller calls, what type of phone line is calling (NXX-type) and the local phone company's policy on re-issuing of phone numbers. Residential and business phone numbers are usually out of service (cooled) for 30 to 90 days before they are re-issued, to inform callers to the cooled or out-of-service ANI that the number has changed.

Residential and business ANI's are expected to receive inbound calls, usually more inbound calls than a cellular phone, where the ANI (for value of "62 or 63" again based on II digits) represents the Caller. For type 1 cellular or II digit code "61" the cellular ANI represents the entire system and the "Caller Name" would be the name of the entire system and useless for change of ownership or almost anything else (possibly all 10,000 ANI's assigned to the exchange), so for II digit code "61" Caller Name would be of no value. Some of the rules that may be incorporated to check "Caller's Name" through use of LIDB:

a) if cellular and the II digits are "61" then do not check—only the system's name is provided;

b) if the Caller has called in the last 7 days or less—do not check "change of name" (do not compare Caller's Name for today with that stored) because ANI are not usually re-issued in less than 7 days;

c) if the Caller has called before and it has been more than 7 days and less than 30 days and the II digits are not "00", "01", or "61" then check the Caller's Name for change since it is not a residence or business (again for II=01 and 61 it does not matter); and d) if the ANI has not called in the last 30 days and the 11 digits are not "01" or "61" then check "change of ownership" by comparing names (again for II=01 and 61 it does not matter).

The above 7 day rules for cellular and other phone types (other than "61, 00, 01") except residential and business (II digit "00") and the 30 day rule for all phones (except "61" and "01" II digits) are reasonably accurate based on the current cooling of phone numbers. These rules would need to be changed if a given LEC (Local Exchange Carrier) started to re-issue numbers faster. In that event, the rules would be changed:

a) on an NPA-NXX (exchange basis) based on the exchanges assigned by the LEC's cooling for shorter periods than planned for (614-847-XXXX for example);

b) based on II digits, that the LEC is re-issuing pay phone (11 digit "27") or cellular (II digits "62" and "63") numbers faster than the typical 7 or 30 days;

c) All the rules may be shifted to represent the current cooling period of the industry;

d) Lastly—every call and/or every call older than 24 hours (or X hours) could be compared for "change of ownership" based on the value of knowing that the ownership has changed.

The Caller ID "Caller Name" (or bill to name) becomes a great tool for an extremely accurate, "change of ownership" indicator. Since 20–25% of all ANI's (billed to name) change each year—this embodiment of the invention would provide an accurate indicator as to whether the "Caller's Name" has changed and whether new data, call treatment, call flow and call processing would be required for a new location calling.

Access to public and private databases that use ANI as a key to the database (this is in addition to the LEC's LIDB): TRW, R. R. Donnley, and others provide on-line and other forms of access to databases that are keyed by ANI. Some of the on-line databases that are available also include households with unpublished phone numbers (unlisted) and provide, for example, the following data:

a) Street address of the ANI 90+% for households 80+% for businesses;

b) 9 digit ZIP Code (ZIP+4), providing a certified postal ZIP for the ANI;

c) Whether the ANI is:
  i) Residential,
  ii) Business at home,
  iii) Business,
  iv) Other (pay phone, unknown, etc.);

d) Household income;

e) Length of time the ANI has been assigned to this location (months, years, etc.).

Again, knowing the street address and 9 digit postal ZIP for an ANI and/or a given phone number, as well as the type of phone, in the present invention has a major impact on the call treatment. Referring now to FIG. 6, a block diagram of the primary elements of the telephone network may be used to illustrate the flow of telephone calls through the network. Calls originate and terminate at devices or terminals 10 such as residential telephones, business telephones, cellular telephones, personal computers and commercial telephones. Calls are routed through a number of devices capable of transporting calls before reaching their destinations. For example, a call placed at a residential telephone 10b may be transported by a switch at the LEC 36 to an IXC switch 42, to a Network to Network switch 44, to a local IXC switch 42, to a PCS cellular switch 20, and finally, to someone's cellular phone 10s. In another example, a call placed at a business phone 10f may be transported by the business's PBX 14 to the LEC switch 36, to an IXC switch 42, to a PCS/Cellular switch 18, and finally, to a cellular phone 10g.

Referring again to FIG. 6, data fields of the telephone call may be read or received and interpreted at a PBX 14, P/C controller 16, switch 12, 18, 20, 24, 26, 36, 38, 40, 42, 44, 48, 50, 52 local or special access devices 28, 34, 54, ACD 30, IVR-32, call processor 22 or set box 46.

These devices in the call flow and in the network, are locations where call processors could be located to gather the network (or switch data) data, such as II digits and then through means of IVR, user-to-user, caller inputs, caller prompts and other call processing procedures as covered in FIG. 1, the identity of the calls and the reason for the call can be collected as needed and/or available.

The call processor possesses the following facilities and attributes:

1) Serviced by and/or connected to a telephone network(s), which includes access to the public network and possible access to private networks as needed. These telephone networks, through connections to one or more IXC's and LEC's (Interexchange Carriers and Local Exchange Companies), allow the calls to be received by a caller dialing an 800 number, 888 numbers, pots numbers (614-847-6000), 900 numbers and other pots and other non-geographic numbers (500-XXX-XXX and 700-XXX-XXXX etc.) and other dialing plans. This access to the public telephone network (and private as needed) allows the call processor to also dial outbound calls to locations in the same city, same state, anywhere in the USA and to phone numbers and access codes to access locations outside the USA. The private network allows calls to be made to devices and switches that can not be reached by dialing the same number and codes over the public network.

Generally speaking, the call processor's access to the telephone network (public or private) data networks, signaling networks and other forms of transmission allows the call processor to receive, connect to, and accept inbound calls to the call processor and other devices associated to or connected with the call processor, and the call processor's access to the telephone network (public and private) allows the call processor to originate outbound calls and tandem (originate and bridge through existing calls, voice and data paths) to other locations on the telephone network both public and private (as needed).

2) The definition of "network data": the call processor, through direct and indirect connections to the telephone network where the network data is passed through a switch and/or an IVR, and/or other devices, but is still considered "network data";

a) Receives signaling information (network data) from the inbound calls that are presented to the call processor. Some of this network associated call data can include:
 i) The dialed number;
 ii) the II digits (Info-indicator digits);
 iii) the ANI (automatic numbering identification); and
 iv) other network data (line, channel, etc.).

Besides receiving network data about elements specific to inbound calls to the call processor, the call processor can receive and control the call connection, in other words the call acceptance and/or the rejection of the inbound call without the need for answering the call through use of ISDN and SS7 signaling and other signaling methods available to the call processor. The call processor receives the IAM (Initial Address Message) of the inbound call from SS7 or ISDN; the line seizure and data for the inband signaling of an inbound call, alert message, disconnect message (call has hung up). The call processor can:
 i) reject the inbound call;
 ii) proceed with the inbound call;
 iii) answer the inbound call;
 iv) disconnect the inbound call; and
 v.) interact with other network switches as necessary.

This "network data" includes call states, network status, elements of the call (II digits) whether part of the signaling network (SS7, ISDN, etc.), as inband data, MF (multifrequency) data, DTMF data, line seizure or disconnect is all considered "network data", whether presented directly or indirectly to the call processor (through other devices and networks).

To place an outbound call, the call processor must also create "network data" and the progress of the outbound call can be monitored, which is also considered "network data".

b) Through the same (or different) telephone network connections, including signaling information and data call elements, the call processor can also originate a call (place an outbound call) into the telephone network, this originated call can also be the outbound portion of a call that is being tandemed (or passed through). The call processor can monitor the progress of the outbound call from answer to a busy (intercept) and even network congestion through the audio path of the call and through the call progress and call status signaling information through use of SS7 and ISDN. The call processor can control the dialed number to determine where the outbound call is to go, what networks are used (public and private, telephone and data). The call processor can even, under certain circumstances:
 i) change or provide the ANI data for the outbound call;
 ii) select carriers by inserting a carrier code (such as 10288 for AT&T) in the dialed number or by selection of trunk and access lines (one group of lines to carrier A, a second group of lines in trunks to IXC B, etc.); and
 iii) include data in the user-to-user field of the IAM of the outbound call.

Summary—the scope of "network data" could be defined as any data that passes over the telephone network that defines, describes, controls, routes, maintains, and informs about the call including the call status at all times. The status of the physical call (pending, ringing, busy), some of the elements that make up the call (II digits, dialed number, ANI, etc.); the status of the call control (call forward or busy, network congestion) and all the other data and call elements of the call are also considered "network data". All these call components help define, describe, control, route, maintain and inform about calls and can be considered "network data" whether directly passed to the call processor as in FIG. 4 through connections 168, 170, 172, or indirectly passed to the call processor as in FIG. 3 again over IVR 138 links 168,170,172 which the IVR 138 passes to the call processor through links 174 and even over private networks again referring to FIG. 3 using data network 140 to pass "network data" from remote location 176 to call processor 152.

3) The call processor(s) can have connections to, interface with, control over, and pass data and commands back and forth with many devices which hereafter will be referred to as "resource data":
 a) Network switches;
 b) Interactive Voice Response (IVR) Systems;
 c) Voice Recognition Devices and Voice Recognition Platforms;
 d) Private Branch Exchange (PBX's);
 e) Public Networks;
 f) Private Networks;
 g) Automated Call Distributors (ACD);
 h) Conference Bridges;
 i) Modem and Data Connections (Internet Access);
 j) E-mail gateways; and
 k) Data storage and retrieval (including audio/voice).

Any device, service or platform that uses the telephone network, a data network, electronic information exchange that can be accessed, used, controlled, shared, updated, modified, stored, transmitted, exchanged. All can be accessed by, shared by, and used by a call processor.

In summary, "resource data" is the information (other than network data) that a call processor can receive, request, cause, control, exchange, modify with other devices the call processor can directly and indirectly access, use, update, transmit to, exchange with and interact with.

4) The call processor can consist of a single or multiple computers (with single and multiple control processing units (CPU's) with associated memory, disk storage, usually a computer operating system (UNIX, Windows-NT, VMS, DOS, etc.) and many control programs that execute the static and dynamic logic that makes up the programming of a call processor.

5) The call processor stores data defined as "stored data" in computer memory for fast recall and for quick comparison to other data. The call processor will also move data back and forth from computer memory to other storage devices which is also considered "stored data" that can usually store larger amounts of data such as disk drives (optional and magnetic disks and even tape storage of data). Many times the disks drives are arranged as mirrored or error correcting arrays, to speed up the retrieval of the data from disk drives back to main memory, and as a data back up for recover so no data is usually lost.

The "stored data" can be data values such as numbers (614-847-6161), text such as words, as relational data where a data element is related to other data elements such as the phone number "614-847-6161" and the city "Worthington, Ohio" is related to the "614-847", as actual recorded callers voice in a digitized fashion, images, objects, calculations, arrays, and even prompts to callers can be prerecorded again in a digitized form as stored data.

The "stored data" can be accessed and stored as part of the call process system, as a shared "stored data" resource between many computers and even as a remote "stored data" storage or a remote "stored data" service facility.

The voice recognition devices also have "stored data" storage in terms of memory, their own custom CPU and usually with load programs for use by the voice recognizers, to load new control programs and to load new words as "stored data" to be recognized as required.

"Stored data" exists in many forms and places in a call processor; from data buffers, controllers, cache memory, computer memory, disk drives and even tape and optical disk devices.

6) The call processor control over other devices (switch, IVR, PBX) can be absolute, shared, indirect, loosely coupled, part-time, as needed or not at all, and the programming will usually reflect the relationship.

This call and caller data collection process is improved by this invention, and all the intermediate points shown in the call flow depicted in FIG. 6 are possible locations or multiple locations.

FIG. 2 of the present invention represents a simplified example of a call flow going through the telephone network. Please refer to FIG. 7 for a more complete example of a call flow. FIG. 2 illustrates that the data portion of the call travels over a separate network as part of SS7, different from older technologies where the call data used to travel with the call. One of the features of SS7 is the fact that the data and control of the telephone call is on a totally separate data network, the SS7 network, traveling separately from the voice or analog portion of the call.

In FIG. 2 a caller 60 lifts the handset on a telephone 62 to initiate a phone call 64 into the telephone network. The LEC (Local Exchange Carrier) switch 66 realizes that the telephone 62 has gone off hook due to current flow, and provides a dial tone to the telephone 62 so that the caller 60 may initiate his telephone call 64 over the telephone network. The caller 60 proceeds to enter the dialed number on the telephone 62 and the data is passed as part of the call 64 to the LEC switch 66. After screening the caller entered call data (dialed number), plus assigning the calling number (ANI) and the II digits defining the line type to the line creating the call, the LEC switch 66 determines if the call is a local call which can be completed by the local LEC network, or if the call should be handed off to an IXC (Interexchange Carrier) for a long distance call or an intra-LATA call that is to be handled by an IXC. For this example it is assumed that an IXC is involved, and that the call will be transported out of the LATA, although it does not have to be, and that the call data will be passed to the IXC for further processing.

The call 64 that was created, and the call's associated information including the dialed number and the number the caller is calling from (ANI) plus other caller data such as the II digits is stored in the LEC switch 66. The LEC switch launches a data element 68 "IAM" (Initial Address Message that contains the dialed number, II digits, and the (ANI) plus other call data to the IXC, who can be selected on a call-by-call basis. The IXC may be the 1+IXC for this caller, or it may be an 800 number, 900 number, 500 number or other type of general purpose number. For example, for an 800 number the LEC switch 66 accesses the SMS 800 data base 112 (this is a simplified diagram) to determine which carrier will be passed the call detail (IAM) for a gateway type call such as a 1-800 call. In this case, the carrier would be selected based on the SMS 800 data base 112 and the call data 68 would be sent from the LEC switch 66 to the STP 70 handling the carrier. At some time a voice path 74 for the voice portion of the call will be selected by the LEC switch 66 and will be presented to the carrier's switch 76 if the LEC switch 66 is to complete the call or provide voice path or additional information such as a ring, intercept, and the answering of the phone call itself, to be passed back over the listen (talk) paths to the Caller 60.

The carrier receives the call data 72 assigns the talk paths 74 and forwards the call data (IAM) on, as call data 78 to an STP 80. The call data (IAM) 82 may be forwarded to an intermediate carrier or enhanced service provider 86 (a place where the call can be further processed). The call path 84 is also selected by the IXC 76 to access the enhanced service point 86. If a call path is not assignable through the network, then the call cannot be completed and a data busy packet will be sent back through the data network to the LEC switch 66 to generate a busy signal to the caller 60. This may occur during any part of the call until answered by the enhanced service point 86. In this example, the enhanced service point 86 will issue an off hook answer SS7 message based on the caller information contained in the IAM, plus other data. Enhanced service point 86 has in its databases on site 114, plus access to remote data bases 120. The Enhanced Service Point 86 sends an "off hook" or SS7 answer message which will be sent backwards through data 82, through STP 80 and data 78, to the IXC switch 76 to tell the IXC to cut through the call voice path 84 to the enhanced service point 86. The IXC 76 will pass back through data 72 through STP 70 through data 68 to the LEC switch 66 that the call 64 will be answered by service point 86 and that the local phone company at switch 66 should complete the call voice path 74 to the IXC 76.

At this point in the answered call, the call path has been established using talk paths (voice/analog channels) 74 and 84 and the enhanced service point 86 based on II digits and other network data and/or switch data is now prompting the caller 60 for the caller's account number, social security number, reason for calling, and/or other enhanced data. Once the enhanced service point 86 has determined as needed who is calling, and as needed why they are calling, the enhanced service point may provide the caller information that the enhanced service point has access to, and/or the enhanced service point can route the call to other locations using public and private networks, as well as put any additional data into an external database 114 as needed, and transfer that data to database 120 as needed, as well as updating the user-to-user field(s) of the IAM (Initial Address Message) to be sent across the data network 88 as needed.

For this example, the call is being sent back out over the public network to reach an agent at home: The call is now ready to be tandemed, or passed on, through the telephone network. The new IAM (with the new and/or modified data) call data is now ready to be presented to the called party (or revised called party—agent 118) in data element 88 which is passed through the STP 90 to data element 92 to IXC 96. The IXC 96 will route the call based on the new dialed number (if changed) and will carry forward the IAM of the call to pass on to the LEC 106 and/or called party as the new called number will designate. The IXC 96 views this call as a tandem call, a call being passed on through the telephone network, and accepts the modified and/or new Dialed Number as well the new or modified IAM as if it were part of the original call record and has no knowledge (unless otherwise informed) that anything has been changed. The IXC 96 based on the new dialed number, routes the call to LEC 106 and sends the data 98 about the call to the LEC's STP 100 which can be forwarded on to the local LEC switch 106 through data 102. The call 108 is then presented to the destination location 110. Based on the invention and the new and/or modified IAM, ANI and/or modified called number, the agent 118 knows precisely who is calling, to the extent needed, based on the data now carried in the IAM, to the agent 118 and accessed by the agent's work station 116. The agent 118 may have direct access to the data stored at database 114 and/or the data stored at location 120 or any other place in the data network. When the agent 118 answers the call, the call is completed from caller 60 through enhanced service point 86 through voice paths 94, 104, and 108.

For example, referring back to FIG. 2, the enhanced service point 86 received an inbound IAM from data 82 that represents an inbound call 84. The enhanced service point 86 saves the incoming IAM data 82 in the input buffer for the call 84 and answers the call by sending progress and SS7 answer messages back through data 82 through the network to the callers LEC switch 66. After the enhanced service point 86 has collected call data from the caller 60 as needed, the enhanced service point 86 takes the saved original incoming IAM data 82 message referenced for the call 84 and places it into a dial out buffet referenced for the new outbound call 94 to be created for the voice path of call 94 represented by the outbound IAM data 88 for the call to be sent as data 88. Before the outbound IAM is sent on as data 88, the corresponding ANI field is changed or modified as needed and/or the dialed number is changed or modified as needed, and data may be placed in the user-to-user element space for the outbound call 94 IAM (data 88) as needed. Now that the IAM data 88 for the outbound call 94 has been modified as needed, the IAM data 88 for the call 94 is presented as a tandemed call to the IXC 96 using data 88, STP 90 and data 92.

FIGS. 3, 4, and 5 refer to different call processing switch, network, and IVR configurations and/or information gathering that will be needed to query the caller to determine who is calling, and why they are calling so that the data can be placed into the telephone network and database if needed. This new enhanced data can flow through the data network (SS7, ISDN) that describes the call as needed and at the same time be accessible through the on-line database network. The caller 130 could also be serviced and/or transferred to devices such as a conference bridge (228) as part of the call.

In FIG. 3 the caller 130 places a telephone call, which is routed through the telephone network 132 to an enhanced service point somewhere in the telephone network. The enhanced service point may be located at the local LEC location or anywhere in the telephone network, and/or may be located at multiple locations in the telephone network or at the destination of the original called location. In FIG. 3 an IVR 138 (interactive voice response unit) is located before the telephone switch 166. The call processing system 152 has access to the telephone network 154 using links [158, 160, 162, 164] through IVR 138 and switch 166.

The data from the telephone network 132 is presented to the call processing controlled IVR system 138 through multiple possible data links. Link 170 would be an SS7 connection, link 168 may be an ISDN data link (D-Channel), link 172 may be a combination of in band voice and data over the same line phone lines, and phone lines 134 and 136 represent traditional telephone lines usually referred to as B-Channels, with associated data carried over links 168 and 170. The call processing system 152 controls the IVR system 138 through links 174 as well as the telephone switch 166 through links 156. The call processing system 152 receives data from the IVR system 138 as well as the telephone switch 166. The II digits, Dialed Number, and ANI data, other network data and/or switch data, and/or database data is evaluated by the call processor 152 through the call processor's access to the IVR 138 by data links 174. In addition, if the telephone call is not on a phone line that is convenient to the call processing system 152, the call processor 152 through the IVR 138 using the ISDN data link 168 or the SS7 data link 170, can renegotiate the calls from phone line 134 or phone line 136, or to other phone lines, to negotiate "the incoming call" to place it on a line of its selection based on services that the call processor 152 would like to see appear or be offered to the caller 130. For example, using channel negotiation, the call may be moved from line 134 to line 136.

The call processor 152 preferably is equipped to greet the caller 130 using the IVR 138, and may proceed to inquire through touch tone, voice recognition, automated agent and other mechanisms to determine who exactly is calling and why they are calling. The call processing system 152 can access local databases 150 and remote databases through network 140 to validate, acquire and update data as needed. If sufficient information cannot be obtained from the caller through an automated interface, then the call processor 152 can instruct the IVR 138 to tell the caller 130 to please hold while the caller is being routed to a live agent. The call processor 152 can then instruct the IVR 138 to send the call through phone line 142 using data link 144 to the telephone switch 166 using control links 156 and 174 to route the telephone call to an agent located on phone lines 146 to collect additional data. Once the agents at location 146 collect additional data and input it into a database 150 through work stations 148 the information will then be accessible by the call processor 152 which will have access to this database through data link 140.

The agent 146, which has access through the agent's terminal 148 through connection to local databases 150 and remote or other databases over data network 140 may be able to complete the reason for the call by the caller 130. The agent 146 may update the local database 150 and remote database over network 140 with updated caller 130 information as needed, and/or the agent 146 may have answered the caller 130 questions as needed.

The agent 146, can take control of the call from call processor 152, and the agent can instruct the call processor 152, through the agent terminal 148 to start a new process with the caller 130, similar or different from the original process call processor 152 had started with caller 130.

The agent 146 can also instruct the call processor 152 through use of the agents terminal 148 or by actions such as hanging up to take the caller 130 back to the IVR 138 to continue the original process or caller 130 or to start a new process by IVR 138 and call processor 152 for caller 130. This sub-process of transferring back and forth between the IVR 138 and the live agent 146 under the controls of the call processor 152 and agent 146 can be repeated as many times as needed for the caller 130.

As a result of information collected by the call processor 152 and/or the agent 146 and any combination, thereof; the result could also be to route the caller 130, at this stage of the call, to a device such as a conference bridge 228 over connection 222, or to other locations to be reached over the telephone network. These other locations could be to:

a) Join a conference;
b) talk to other agents at other locations;
c) log onto other computers;
d) complete a call to a phone anywhere in the world;
e) provide a service to the caller 130 using the phone network;
f) collect more information from the caller 130; and
g) provide other audio services to the caller 130.

As a continuation of this process, it is assumed that the caller 130 requires access to a service that can be reached on another location on the phone network (either public or private).

The call processor 152 has multiple choices as to how to present the call out to the telephone network. Two of these choices follow:

(a) The call processor 152 can instruct the IVR 138 to drop the phone call link going to agent 146 over telephone line 142 while holding onto the caller 130. The call processor 152 instructs the IVR 138 to change the dialed number and/or the IAM of the new call and initiate a phone call over data link 162 out into the telephone network 154 using phone lines 164. Telephone network 154 may route the call to remote location 176, based on data in the call's IAM. At any point in time the remote locations 176 can again instruct the call to be transferred, more data to be collected, the call to be re-routed using networks at remote location 176 and additional call forwarding or call processing to occur as necessary. The IVR 138 can also instruct the switch 154 to drop the call that is at location 176 while holding onto the caller 130 and the IVR 138 can initiate a new call, a conference call, prompt the caller 130 or any other new call routing, by having the call processor 152 initiate a new call through the IVR 138 with new call data (dialed number and/or IAM) as a new call is presented over data link 162 and phone lines 164 to telephone network 154 without dropping the caller 130.

(b) The call processor 152 using data link 156 instructs the telephone switch 166 to drop the agent off of link 146 while holding the caller 130 at the switch 166 and to instruct the telephone switch 166 to initiate an out bound call into the phone network 154 using the data link 158 and the voice paths 160. As in paragraph "a" above, the call will then be routed over the public telephone network, and/or the private telephone network with the current call routing and destination using the same or a new dialed number and/or modified or new IAM which will carry information that will trigger receipt of the telephone call at a far end destination with special treatment. The additional call data can be retrieved from call processor 152 as well as the agent database 150 through the data network 140 supporting the remote sites 176, 177, remote agents and remote centers with additional call data. When the remote sites and remote agents are finished with the call, the call can again be forwarded on, taken back while holding onto the caller 130 for additional prompting of the caller 130 as needed and for re-routing again by switch 166 or terminated, depending on the needs of the caller.

From a comparison of FIG. 4 with FIG. 3 and FIG. 5, it may be recognized that when the call processing (ACD, IVR) functions are all integrated into a centralized switch, under the call processor's control, the telephone network interfacing may become simpler and call control and call processing may also become simpler. As shown in FIG. 4, the interactive IVR systems, the switch, and the call processor may still be separate functions, which are now integrated and appear as one continuous system to the call processor 190 such that the switching and/or voice processing and data collection are now integrated as one entity call processor 190.

Referring to FIG. 4, the caller 130 places a telephone call, which is routed through the telephone network 132, to an enhanced service point somewhere in the telephone network. The enhanced service point can be located at the local LEC location, at a customer's site, or anywhere in the telephone network, or at multiple locations in the telephone network. For FIG. 4, the call processing system 190 has direct access to the telephone network 132 and telephone network 154 as well as to the local and remote agents 192, as well as indirect access to the agent work stations 148 and data base 150 through the data network access 140.

The data from the telephone network 132 is presented to the call processing system 190 through multiple possible data links. Link 170 could be an SS7 connection, link 168 could be an ISDN data link(s) as D-Channels, while link 172 could be a combination of in band data and voice using the same phone lines. Phone lines 134 and 136 represent traditional telephone lines usually referred to as B-Channels for those telephone calls who's associated data is carried over associated links 168 and 170. The call processing system 190 controls the IVR functions, which along with the telephone switch, is also integrated into the call processing system 190. The II digits, dialed number, and ANI data, plus other network data and/or switch data presented over links 168, 170, 172 and/or database data 150 is evaluated by the call processing system 190, and in addition, if the telephone call is not on a phone line convenient for the call processing system, the call processing system through its data link connections 168 and/or 170, can renegotiate the calls from phone line 134 or phone line 136 to other phone lines to place the call on a line that is selected based on services that the call processor 190 determines from information received from the call and/or the caller should appear or be offered to the caller. For example, using channel negotiation, the caller 130 is moved from line 134 to line 136. The call processor 190 greets the caller using the integrated IVR as part of the call processor and proceeds to inquire through touch tone, voice recognition, automated agents and/or other known mechanisms to determine who exactly is calling and why they are calling, as necessary. If sufficient information cannot be obtained from the caller through an automated interface, than the call processor 190 can route the calls through the integrated ACD which is also part of the call processor 190. While placing the caller 130 on hold, the caller may be routed to a live agent that can be local and/or remote through live agent lines 192.

Once the agents at location 192 collect additional data and input it into the database 150 through work station connections 148, the information will then be accessible by the call processor 190 which will have access to this data through the database connection 140.

Just as in the previous reference to FIG. 3, the call processor 190 can provide information to the caller, and/or caller information from the caller and/or proceed to process the caller 130 as needed, if all the resources needed by caller 130 are available to call processor 190.

Call processor 190 can provide data and/or information from database 150 and data from other databases accessed over data network 140 to caller 130 and the call processor 190; through information supplied by caller 130, agents 192 and other sources and computations can update database 150 and other databases over access by data network 140.

The call processor 190 through the integrated IVR and access of other resources and agents 192 can interact and supply the caller 130 based on the resources available to call processor 190. The call processor 190 can transfer the caller 130 to the internet services 230 over connection 224 if needed.

In some cases, all the services needed by caller 130 may not be available to call processor 190 or for economic, resources available and other resources, the caller 130 may need to be transferred to another location using the telephone network. This again can be accomplished by call processor 190 as shown in FIG. 4 as follows:

The call processor 190 has multiple choices as to how to present the call to the telephone network 154 using data links 162 and phone lines 164. The call processor can now change and/or modify the dialed number as needed and/or change and/or modify the IAM for the new call as needed, as well as place additional data in the call processor's database as well as other database(s) 150 and other databases using data network connection 140. The call processor 190 can also place any additional information necessary in the user-to-user IAM (Initial Address Message) of the telephone call to initiate out into the telephone network 154.

The call is now ready to be tandemed, or passed on, through the telephone network 154, (note telephone network 154 could just as well be telephone network 132) and the new IAM (Initial Address Message with the new and or modified data) call data is now presented to the telephone network 154 through data link 162 with the audio portion using phone lines 164 (note the call could just as well been sent out to telephone network 132 to access remote site 177 instead of telephone network 154). The telephone network 154 (and/or 132) can view this call data as a tandem call, or a call being passed on through the telephone network, and accepts the modified and/or new dialed number as well as the modified and/or new IAM of the new call as if they were part of the original call record and the telephone network 154 (and/or 132) has no knowledge (unless otherwise necessary) that anything has been changed. Any one or more remote locations 176, 179, 177 will receive the call and answer the call according to the modified information that is being presented to the remote location. Upon the completion of the processing of the call, the remote location can:

(a) terminate the call;
(b) transfer the call to another location and provide the same dialed number and/or IAM modification and/or any other data modification as needed, update database information as well as database updates to the call processor's data and other remote databases 150 using data network 140 as needed; or
(c) transfer back to the call processor 190 using the data network 140, that the remote location (176, 177, 179, etc.) would like the call processor to take the call back while not dropping the caller 130 and process the call further to other remote locations and/or other locations and functions available to the caller 130 through the public telephone network and the private telephone network.

The call processor 190 may drop the telephone call link going out over line 164 using telephone network 154 while still maintaining the connection to the caller 130 through the telephone network 132 through the call processor 190 without impacting or affecting the caller 130. This allows the call processor to (a) collect more data;
(b) interact with the caller using the integrated IVR and agents 192 as needed;
(c) use existing and currently collected data stored at locations 190, 150, 176, 177, 179 and elsewhere through data link 140; and/or
(d) modify the dialed number and/or call data of the call again as needed, and if additional remotes locations are needed then launching successive telephone calls into telephone network 154 using phone lines 164 and data link 162 and/or into telephone network 132 using phone lines 134, 136 with data links 168, 170. This process can be repeated until all of the reasons for the call have been satisfied. All of the data will then be available through single and multiple databases 150 and others accessed through data network 140 and/or databases managed by the call processor 1.90, for final billing and/or reporting as needed.

In FIG. 5, the call processor 152 which is controlling the telephone switch 200 through data lines 208 is connected to the IVR 210 which is now located after the telephone switch 200. In addition, FIG. 5 shows remote and local agents 212 who are hanging directly off of the IVR 210, in addition to the traditional agents 216 who are hanging off of the ACD switch 200 through lines 192. FIG. 5 also shows voice with in band data 206 being transferred between telephone switch and ACD 200 and the IVR 210 (which is in addition to the in band data with voice between the telephone network 132 over link 172 to the telephone switch and ACD 200, which is common to both FIGS. 3 and 4 as well). All the functionalities provided through FIGS. 3 and 4 are also accomplished in the embodiment shown in FIG. 5 with the call processing 152 through the data links 208 managing the switch 200 as well as the IVR 210 being located behind the switch and being managed by the call processor 152 through data links 214.

The caller 130 places a telephone call which is routed through the telephone network 132 to one or more enhanced service points at predetermined location(s) in the telephone network. The enhanced service points can be located at the local LEC location or anywhere in the telephone network, at a customer's location, or at multiple locations in the telephone network. For FIG. 5, the IVR 210 is located after the switch 200, and both the switch 200 through data lines 208 and the IVR 210 through data lines 214 are preferably being controlled by the same call processor 152 directly and/or indirectly.

The data from the telephone network 132 is presented to the call processing system 152 through use of the switch 200 passing on data and control to the call processor through data link 208. For the switch, link 170 may be an SS7 connection, link 168 may be an ISDN data link with D-Channels, and link 172 may be a combination of in band data and voice over the same phone lines. Phone lines 134 and 136 represent traditional telephone lines usually referred to as B-Channels for those telephone calls whose associated data is carried over links 168 and 170. The data is captured by the telephone switch 200 and passed on to the call processing system 152 through the data link 208. The II digits, dialed number, and ANI plus other network data and/or switch data and/or database(s) through access by data network 140 plus database(s) 150 are evaluated by the call processing system 152. If the telephone call is not on a phone line convenient for the call processing system 152, the call processing system 152, through the connection 208 to the telephone switch 200, can cause the telephone switch to renegotiate the proper location of the call on the proper phone lines, giving the best service to the caller.

The call processor 152 then initiates a telephone call using switch control links 208 between the switch 200 and the IVR 210 using data links 204, 144 or 206 with associated phone lines 202, 142 or 206 such that the call is presented to the IVR 210 for greeting. Now that the caller 130 has been forwarded all the way through to the IVR 210, the call processor 152 may instruct the IVR 210 to greet the caller using the IVR as part of the call processor's functions and can then proceed to inquire through touch tone, voice recognition, automated agents and/or other mechanisms to determine who exactly is calling, and why they are calling as necessary.

If sufficient information cannot be obtained from the caller through an automated interface then the call processor can route the caller through to the integrated IVR agents 212, which can be both remote and/or local, and/or the IVR under the control of the call processor 152 can link back through to the switch 200 using data lines 204, 144 and/or 206 and bridge the voice path back to the switch using phone lines 202, 142, and/or 206 to reach integrated agents 216 hanging off of switch 200 using lines 192. In either case, the IVR 210, using its directly attached IVR agents 212 or its indirectly attached IVR agents 216 accessed through the switch 200, gets the caller 130 to a live agent.

Once the agents at location 212 and/or 216 collect additional data and input it into the database 150 through work station connections 148, the information will then be accessible by the call processor 152 which will have access to this data through the database connection 140.

Just as in the previous reference to FIGS. 3 and 4 before, for the this FIG. 5, the call processor 152 through use of the IVR 210 and/or the agent 212 and/or the agents 216 through access to databases 153 and 150 and other databases accessed through data network 140 can provide information and service to the caller 130, collect and store information from the caller 130 and the call processor 152 can continue to interact (as needed) with the caller 130 and delivers services to caller 130 and update information and/or direct the caller to agents 212 and 216 and other devices available through IVR 210 and/or other devices connected to switch 200 (such as a conference bridge 228 or other services 232) or features available in switch 200 or connected to switch 200. The call processor 152 under its program control and/or under the control of agents 212 and agents 216 can change, end, or initiate new process for caller 130 as needed or required.

If as part of the existing, modified, or a new process, the call process 152 needs to connect the caller 130 to the telephone network (for example—to complete a phone call to a party at their home or office) to reach other resources on the telephone network, it could be accomplished as follows:

The call processor 152 has multiple choices as to how to present the call to the telephone network 154 using data links 162 and phone lines 164 and/or to the telephone network 132 using data links 168, 170 and voice links 134, 136. The call processor 152 can now change and/or modify the dialed number as needed and/or change and/or modify the IAM of the new call as needed as well as place additional data in the call processor's database 153 as well as data base 150. The call processor 152 may also place any additional information necessary in the user-to-user IAM (Initial Address Message) of the telephone call before initiating the call into the telephone network 154 (and/or 132).

The call is now ready to be tandem, or passed on, through the telephone network 154, and the new IAM (Initial Address Message with the updated and or modified data) call data is now presented to the telephone network through data link 162 with the audio portion using phone lines 164. The telephone network views this call data as a tandem call, or a call being passed on through the telephone network, and accepts the modified and/or new dialed number as well as the modified and/or new IAM data as if they were part of the original call record. The telephone network 154 does not have to have knowledge that anything has been changed but such knowledge could be provided to the telephone network, if requested or if otherwise needed. The remote location 176 (and/or 177) will receive the call and answer the call according to the modified information that is being presented to the remote location. Once the call has been answered (or before if necessary) at the remote location 176, the call processor 152 will need to bridge the caller 130 through the switch 200 dropping the IVR 210 out of the call without dropping the caller 130. The caller 130 is now connected from network 132 using lines 134, 136 or 172 to the switch 200 to network 154 using lines 164 to reach location 176. Upon the completion of the processing of the call at location 176, the remote location 176 can:

(a) terminate the call;
(b) transfer the call to another location and provide the same dialed number and/or ANI modification and/or any other data modification as needed, update database information at location 176 as well as database updates to the call processor's data 153 and other databases 150 and other databases as needed using data network 140; or
(c) transfer back to the call processor 152 control using the data network 140, that the remote location 176 would like the call processor 152 to take the call back while not dropping the caller 130 and process the call further to other remote locations such as 177 using network 132 and/or other functions available to the caller through the public telephone network and the private telephone network.

The call processor 152 can drop the telephone call link going out over line 164 using telephone network 154 while still maintaining the connection to the caller 130 through the telephone switch 200 and the network 132, without impacting the caller 130. This allows the call processor 152 to reconnect the caller 130 to the IVR 210 from the switch 200 over phone lines 202, 142, or 206 to again query the caller to:

(a) collect more data;
(b) use existing and currently collected data stored at locations 150, 153, 176 and elsewhere through data link 140;

(c) modify the dialed number and/or stored data of the call again as needed;
(d) have live agents 212 and/or agents 216 interact with the caller 130 as needed; and
(e) change and/or modify or switch the caller 130 to a new process.

And as needed, call processor 152 can launch successive telephone calls into telephone network 154 and/or 132 and bridging the call through switch 200, the process of data collection and modification and caller 130 interaction, caller 130 access to services and information can be repeated until all of the reasons for the call have been satisfied. All of the call data will then be available through single and multiple databases on data network 140 and/or databases 153 managed by the call processor 152 for final billing and/or reporting as needed.

Many of the components described in FIGS. 2–6 are commercially available. The telephone network switches 132, 154 may be, for example, an AT&T 4E or a Northern Telecom DMS 250. IVR's are available from Periphonics Corporation, while AT&T also makes an IVR known as Conversant. Harris and Summa4 make telephone switches with ACD 200. Several remote switches such as the AT&T G3 are available. Several call processors 152 are available, such as Sun Microsystems Sparc 20, DEC's Alpha Computer and the Intel Pentium, to name just a few examples of call processors. Several database products 150, 153 are available, for example, Oracle and Sybase. The previously mentioned products and companies are generally widely known and available.

FIG. 6 shows various examples of call processing environments, in which the present invention may be incorporated.

The following are examples of uses of the invention:

EXAMPLES

Example #1

Electronic transcription for 80–90% of the Callers. A Caller dials a number (800, POTS, etc.) to request literature on a product (or Service). The program describes the product and the literature that is to be sent and then asks the Caller to first speak (and/or touch tone) the 10 digit phone number to where the literature that describes the product is to be mailed (sent). The program accesses the street address database by ANI to see if the street address is already known and whether the address is residential, business at home, or commercial.

Assume a Business at Home Address is Returned by the Database:

The program would explain to the Caller that it believes it already has the address for the number given, and if the Caller would confirm the street number, i.e. the Caller's street number is "1190" yes/no and the Caller's ZIP Code is "43081" yes/no. Since the database has over 90% of the residential addresses and business at home addresses for ANI's, if the Caller confirms the address and ZIP, then no further input would be needed from the Caller (except name if the literature was to also include the Caller's name).

For Example #1 above; if the literature is addressed to "Requester or Occupant" then for 80–90% of the Callers, the electronic record would be complete to the extent necessary for mailing and the call could end in less than 45–60 seconds, and the electronic record could be part of a mailing batch that could go out that night.

Example #2

Similar to Example #1 above, assume that the number given is a residential phone number which is looked up and confirmed by the Caller, but additional information is asked from the Caller, such as a marketing survey (where ad was seen, quality of ad, first time product ever considered) and other responses are collected. These responses may be through key word voice recognition, touch tone input, and/or words spoken by the Caller that are later transcribed. For the data type response such as touch tone and/or voice recognition, this data is added to the already stored name and address data for this call which is already in electronic form. The use of the ANI keyed database and the confirmation of the data saves the Caller time in responding to questions to collect data that is available from an ANI keyed database.

In Example #2 above, assume that some of the data collected from the Caller was collected as spoken audio in the Caller's voice. In addition, the spoken voice may be transcribed to convert the spoken voice into a data format to append to the data portion of the call collected by the call processor. If the Caller did not give a specific account number or ID number (such as a Social Security Number) to use as a reference, ("unique key") then the unique record number the system would assign to the computer formatted data may be used as the "unique key" data identifier to the recorded audio to be transcribed with the balance of the Caller's recorded voice. In this manner, when the Caller's data which was left in the caller's voice was transcribed to convert the Caller's name, and other data left in the Caller's voice as responses to questions, the addition of the "unique key" as part of the recorded voice would allow the transcribed data to be merged with the machine collected data (touch tone, voice recognition, number dialed, II digits, NXX-type, retrieved from ANI data base, etc.) to generate a more complete record representing the Caller's data as needed.

Example #3

The phone number supplied by the Caller is retrieved by the ANI keyed database as a business, or is not found in the database, or the Caller rejects the address retrieved by the database—in these cases the phone number given would be treated just as data and the Caller would need to provide all data (i.e. name, address, city, state, ZIP) plus any other data to be collected. This data may be recorded in the Caller's voice for later transcription in combination with data collected by the call processor through touch tone input, voice recognition, etc., and the different data sets may again be linked using a "unique key" described in Example #2 above, or the call may be transferred to a live agent which would ask, and may on-line transcribe and summarize, the Caller's inputs.

For many databases, the Caller's ANI (or the Calling Number) is not the significant data item. For many applications, knowing the true Caller identifier and then validating this number is of major importance. The goal is to find out who is calling and why.

To identify the who, many of the following "unique key" numbers are requested as part of the call processing data gathering function, some types of the "unique key" numbers are:
a) Voice Mail Box Numbers;
b) Frequent Flyer Number—unique for the airline you called;
c) Social Security Number—unique to only one person;

d) Credit Card Number—unique to the Card Holder;
e) Electric Utility Account Number—unique for a given utility;
f) Serial Number of a Product or License;
g) Ticket Number or a Sweepstakes Entry Number.

In many applications, once the "unique key" for the application (company, service, product, etc.) is learned (and confirmed if needed) then the exact customer, person, product, ticket, and/or item is learned as a function of the "unique key". The "unique key" could represent a sub-set and/or a group of people, such as an investment club, and/or the individual investors themselves. For many call processing applications, obtaining the "unique key" usually identifies who is calling to the extent needed, and in some cases the "unique key" may provide the information the Caller seeks.

Example #4

A college desires to automate the application process, so a "unique key" is assigned to every application the college gives out including a phone number for the Caller to use to check the status of the application. The Caller (applicant) can call as often as the applicant desires and enters the "unique key" for the application to the college. The call processor collects network statistics such as II digits, unique key, and NPA-NXX type for later analysis and contains a database of all known applications by "unique key" and the application's current status. Some of the responses a Caller might hear are:
a) Application not yet received;
b) Application received—but can not be processed—applicant has been mailed a request for more information;
c) Application accepted, applicant must accept position and secure financing—package has been mailed to applicant;
d) Applicant is 112th on the waiting list—4% chance of gaining admission; and
e) Application rejected—best wishes.

For the above call processing example, the "unique key" not only defined the applicant but also reported the current status. This was only an example—many more applicant conditions could easily be added to the example.

Example #5

The Caller calls a rental car customer service number and the car rental company call processor inquires for a contract number or a customer number. If the Caller enters a contract number, the car rental company's call processor will change the questions it asks, since it has now identified a car that is out on rental and who the car was rented to. The knowledge of the "unique key" changes the call processor's data collection flow.

Example #6

Accessing information based on a "unique key" changes the whole dynamics of the call processing model. The "unique key" can define who is calling as needed and even some of the reasons as to why they are calling. In an earlier example, the unique key was the Dialed Number. For those that call 614-645-GOLD (614-645-4653) the Dialed Number represents the data and the unique key for the caller.

In summary, the "unique key" to the application can be far ranging, it can represent the Caller (Social Security Number, etc.), a transaction with the Caller (ticket, contract, application, etc.) and/or a subset of the Caller (all the Gold trash designated residences in Columbus, Ohio).

Caller ID—LIDB was used to cause the call processor to change data input formats based on change of ownership. This is but one way to detect change of ownership which will then change the data input formats. Other methods to detect change in ownership are as follows:
1) Caller fails to enter a unique key data item such as the customer account number.
2) Other data bases are accessed to check stored data with current data.
 a) Vehicle number does not exist in this state.
 b) Street address on file for this ANI has changed.
 c) Other data items and data bases.
3) Caller identifies themselves as new to the system, call processor, or application.
4) Change in the data base information indicates that the caller's status, limits, or no longer allows, this function. For example:
 a) International calls no longer allowed.
 b) Caller no longer has access to a weather or stock service that is available to other callers.

Change of ownership or status is critical to the call processing, the options and services offered the caller, and the caller data format offered the caller.

Example #7

Based on the fact that the caller is no longer a platinum member of the Frequent Flyer club, the call handling, priority, and options offered the caller will be greatly changed.

Example #8

The user-to user field of the Initial Address Message (IAM) of a call can be used under ISDN and SS7 to transfer data information from one call location to another. The use of this user-to-user data field allows one calling party to expedite and completely change or enhance the call processing function. If a user on a PC using an ISDN line initiates a call through the PC and all the call processing requirements have been pre-loaded (or partially loaded) so that a data-gram in the user-to-user data fields is carrying some or all of the following information:
 who is calling
 what does the caller want
 authentication
 call routing, The call processor would validate the data in the call user-to-user data field as needed and process the call for the caller with little or no additional input from the caller.

A good example is where a log-on script is stored in a PC to dial to, and log on, a data network and then access the E-Mail account and then up load all new E-Mail to be sent, and down load all new E-Mail to be read, and then force the system to hang up when the E-Mail has been down loaded. This could also be accomplished in the user-to-user data field of the initial call to the network and no other data would need to be sent to define who is calling and why they are calling.

Line status: the call processor should normally not be allowed to reach a status of all in-bound lines busy. Once a call processor, or any device on the SS7, ISDN, or digital access interface, reaches a status of all lines busy, the network will no longer present calls to that location, since that location can no longer accept the calls.

Another way of stating this concept is: the call processor must have a small percent of in-bound lines that are reserved for high priority calls, so that even when the in-bound utilization reaches 90–95%, a high priority call can still be received.

In-bound calls and in-bound applications can be assigned a priority, such that the call processor will reject new calls as presented when the call processor gets progressively busier. For example, after the in-bound reaches 85%, a call to this location may be rejected since that in-bound call may be re-routed on a busy using an AT&T network feature such as Alternate Destination Routing (ADR) and the call will just be routed to an alternate destination if ADR is a feature of the call when it is electronically refused at this location.

The call processor, over data channels with the network (SS7 and ISDN), can easily reject 50 calls a second per data channel. This allows the call processor to reject up to 180,000 calls per hour per data channel. If the call processor keeps some in-bound lines open by rejecting the calls, then the network will continue to present calls to the call processor in an attempt to utilize the still open lines which allows the call processor to be selective as to which new calls to answer. On the other hand, if all in-bound lines to the call processor are 100% utilized, (all in use) then the network will not present any new calls to the call processor until a line becomes available, and if only one line becomes available, then only one call will be presented. As the call processor fills up, calls need to be shed or rejected based on:

a) Priority of the calls based on network information and/or switch information (Info Indicator digits, Dialed Number, ANI);

b) Advanced features of the network based on the Dialed Number—call will route to another site (ADR);

c) A list of priority calls (II digits, Dialed Number, ANI, etc.) that must get through while blocking other calls at certain levels of utilization based on certain rules;

d) Reject calls, because enhanced features, such as text to speech or word spotting, is over utilized in the call processor and the call processor would be tying up an in-bound port that would later fail because of current utilization of a feature;

e) Reject calls, based on network and data base data, because the anticipated routing to be needed to other services by the call processor is not, or likely, will not be available. For example, all conference ports are currently full and the que for conference ports is at the pre-determined maximum;

f) To capture network data and/or switch data once the in-bound ports fill up and/or are assigned to pending in-bound or out-bound calls, the network data will cease or no longer be presented to the call processor. It may become impossible to analyze how many calls where lost and the associated network data and/or switch data, if the in-bound ports all fill up and then the network data ceases. The value of learning what was lost and when, may exceed the value of answering the few extra calls on those set-aside lines;

g) To keep channels open for priority calls that must get through. If all the in-bound ports are tied up, then a priority in-bound call that could be updating the information that other caller's are listening to, must be able to get in to make the information update;

h) To give 100% service to some numbers and some programs. Because of business, contract, and/or the critical nature of a program or process, the level of desired service to a customer or program may be 100%. In many cases, the calls to a call processor are contentious in nature, where multiple numbers, applications, customers, and callers share on a contentious basis a group of trunks and/or lines to a call processing and switching facility. In some instances, the call volume can drive the call processing facility to over 100% utilization, in which case, random callers and calls will get a busy, unless the call busies (rejections) are managed by the call processor on a selective basis. For some call types, the goal may be no busies, and this can be achieved in part, through the call processor managing rejection of lower priority calls.

The call processor must also be aware of the resources available to the call processor, and as those resources become unavailable, the call processor could:

a) No longer offer that resource to the caller. For example, if all the voice recognition or word spotting resources are totally in use, then that resource may not be offered to the caller. The input template offered the caller could dynamically change, based on the resources available for that call (live agents not offered because the que is full, etc.);

b) The call processor may substitute a different resource because of the failure or unavailability of a resource. For example, if the call processor can not acquire a single spoken digit voice recognizer due to availability or failure, the voice processor may substitute a continuous speech recognizer and/or a word spotting recognizer and the input template and instructions to the caller then would change based on the resource available (even a live agent could be substituted);

c) The que depth, line utilization, agents in use, ports to a conference bridge, calls using text to speech, and/or any other on hand or resource usually available to the call processor through access lines, switches and the networks that become unavailable or scarce can impact the caller input format, and caller prompting, and even the acceptance of the call itself. For example, a courtesy message that "all lines are busy, please call back in 15 minutes" would cause a shift in the call flow and flatten out a call spike, yet the next caller to the same number may be greeted and processed based on the dynamic status of the call processor and the associated resources available!

Some of the critical "Line Status" and "Call Control" features are:

a) Do not go 100% busy, to be able to continue to collect network data and/or switch data;

b) Do not go 100% busy, so the critical calls can get through;

c) Do not go 100% busy, so those numbers that need 100% service do not get busied-out by shared usage;

d) Reject calls based on dynamic and static availability of resources; and e) Change caller input format and caller data prompts based on resources available and resources not available, as a function of "Line Status" and "Call Control".

Lastly, through the use of SS7 and ISDN, the port assigned by the network for the planned call becomes available in milliseconds for the next call. The "busy" the caller hears, is not at the call processor location, but earlier in the call flow, usually at one of the LEC SSP switches or at an IXC origination switch. When the call is rejected by ISDN or SS7, the port becomes available in milliseconds for the next proposed call.

The value of information indicator digits can not be understated, the type of line and the value of the ANI as defined by the II digits:

a) II digits can validate that the ANI represents the line and is unrestricted (II=00 and II=60 a home or business):

b) That the ANI represents the line, and additional information about the ANI (Line):
   II=27=Coin Phone;
   II=29=Prison/Inmate Service;
   II=62=Cellular Phone in home area;
   II=63=Cellular Phone in roam state;
   II=67=Restricted line—sent paid not allowed.
c) That the ANI does not represent the line, the 11 digits invalidate the ANI:
   II=01=Multi-Party Line;
   II=02=ANI Failure—ANI must be requested;
   II=61=ANI is the same for all 10,000=the systems ANI, not the cell-phone;
   II=93=Private virtual network phone, ANI may be that of IXC.
d) That the ANI is a Gateway ANI, and that the ANI can represent hundreds and thousands of individual callers:
   II=06=Hotel/motel and room number not presented;
   II=20=PBX and the line number is being sent as the ANI;
   II=27=Coin or pay phone;
   II=61=ANI is the cellular system's ANI for all 10,000 cellular customers and the ANI is the same for all;
   II=70=Private pay phone, a customer owned coin operated pay station and/or a coin operated pay station, or some other private pay phone.

II digits (a) validate ANI (b) add additional information (c) invalidate the ANI (d) and inform if the ANI is a gateway ANI verses a line ANI.

Through the nationwide conversion of the local LEC switches to equal access (See FIG. 8, FCC report dated Dec. 31, 1994 showing Equal Access conversion), II digits have become a new, nationwide element of the network knowledge. In the past, for call processing (and the associated IVR call prompting and call routing) these were only 2 network elements, now with the addition of II digits—there are 3 network elements presented with each call. The II digits, define, expand, refine, redefine and invalidate the ANI network data and/or switch data for every call.
1) Dialed Number (existing);
2) ANI (the caller number—billing number);
3) II digits that define, redefine and even invalidate the ANI (2) above.

The present invention includes the concept of using II digits by themselves and in combination with dialed number and/or ANI for call processing.

Example 9

A mail order company "X" desires to separate calls from prisons and inmate services (II digits "29) from the rest of the callers to company "X" 800 customer ordering number. These prison and inmate originated calls could need a higher screening by a separate group of operators before the merchandise is shipped as directed by the inmates. Knowledge of this group of callers would greatly reduce the loss of goods to this group of callers. Since this group of callers is in a very high risk category, the ability to recognize and route, prompt, greet, this group of callers would be of value to most mail order companies.

Example 10

A company who is conducting a 800 marketing promotion, probably would like to review the demographics of the callers to the promotion. This demographic data usually includes the ANI of the caller. By including the II digits in the demographic analysis:

a) Additional knowledge not provided by ANI is gained (pay phone, business phone, PBX, virtual IXC phones, prisons, etc.);
b) Demographic data is excluded from some phones (II=63 cellular phone in roam);
c) Call frequency by ANI can be adjusted for gateway phone(s) and invalidate ANI's,
   II=20=PBX,
   II=61=Cellular, all 10,000 some ANI,
   II=02=ANI failure, ANI not valid.

The Caller Analysis and Demographics change significantly by adding the knowledge provided by the II digits and by taking into account how the II digits redefine or nullify the ANI.

The present invention includes the use of II digits (network provided call data) that is presented with the other call data as part of the network data and/or switch data that identifies a call to a call processor, IVR that is part of the call greeting and routing of a call processing system, an ACD (automated call distributor) that may route the caller different based on II digits and other network knowledge, a call switching and call routing system that routes the calls for call handling, greeting, prioritizing, handling and processing based on II digits and other network knowledge (dialed number and/or ANI) and/or other stored and inputted knowledge.

The NPA-NXX type and II digits are useful knowledge for cellular phones. Many cellular phone users are calling from moving vehicles, and in some states it may be against the law for the driver of the car to have to take their eyes off the road and fumble with the phone (using both hands) to enter touch tone inputs. Knowing that the caller is calling from a cellular phone NPA-NXX type "04" and (II digit codes 61, 62, 63) would discourage requesting the caller for touch tone inputs.

Example 11

The call processor receives a call and checks the call with the Bellcore NPA-NXX (exchange) database to determine NPA-NXX type. After determining the phone type to be cellular, the caller is prompted for voice recognition responses to questions, not touch tone. Based on the fact that the caller is cellular, no touch tone inputs are requested from the caller, only voice recognition, word spotting (automated) and live agent are used to help the caller.

The NPA-NXX helps define other phone types that are not always available from other network data and/or switch data, such as:
   02—Fully dedicated to paging by recognizing the return to phone number that a caller left as a pager number, then leaving a touch tone data message as part of an automated call back would be appropriate;
   04—Fully dedicated to cellular;
   06—Maritime;
   07—AIR to ground;
   10—Called party pays;
   16—Originating only;
   88—Toll station, ring down.

Again, the present invention uses the NPA-NXX to gather knowledge about the calling party, the party to be called, and/or the party to be called back.

Example 12

A call processor providing a debit card or calling card application, checks the dialed number and determines that the dialed number is a pager. Then the debit card/calling card application program lengthens the length of a tone usually required to end the call and return the caller to the calling card menu. This is done to eliminate confusion between leaving a message on the pager in tones and the "long touch tone" command to drop the pager (the current out bound call) to return to the menu of the calling card program to start another call.

In this application, both the use of short duration touch tones and long duration touch tones are supported, where the length of the touch tone changes or gives a new value to the meaning of the touch tone.

Changes may be made in the construction and operation of the various elements described herein or in the steps or the sequence of steps of the methods described herein without departing from the spirit and the scope of the invention as defined in the following claims.

The invention claimed is:

1. A method of handling a call, wherein the call is made from a certain type of telephone device, said method comprising the steps of:
   providing a device with resources which receives and analyzes information associated with said call;
   receiving said information, including information indicator digits, associated with said call at said device, wherein the information indicator digits indicate the certain type of telephone device from which the call has been made;
   processing said information associated with said call, including the information indicator digits;
   determining the certain type of telephone device from which the call has been made based on the information indicator digits; and
   handling said call in a particular way based on said certain type of telephone device from which the call has been made and said processing of said information associated with said call, wherein the act of handling said call comprises routing the call along a network path that is predeterminedly associated with calls that are made from the certain type of telephone device from which the call has been made, wherein the network path that is predeterminedly associated with calls that are made from the certain type of telephone device from which the call has been made is dedicated to calls that are made from the certain type of telephone device from which the call has been made.

2. The method of claim 1, wherein said information associated with said call further includes a dialed number.

3. The method of claim 1, wherein said information associated with said call further includes automatic number identification (ANI).

4. The method of claim 1, wherein said information associated with said call further includes stored data related to ANI.

5. The method of claim 1, wherein said information associated with said call further includes information inputted by the caller.

6. The method of claim 1, wherein said information associated with said call further includes network data.

7. The method of claim 1, wherein said information associated with said call further includes resource data.

8. The method of claim 1, wherein the processing of said information associated with said call includes retrieving stored data.

9. The method of claim 1, wherein the information indicator digits indicate that the call has been made from one or more of:
   i) a multiparty line,
   ii) a private branch exchange,
   iii) a cellular phone,
   iv) a pay phone,
   v) a virtual network,
   vi) a residential phone,
   vii) a business phone, or
   viii) a restricted line.

10. The method of claim 1, wherein the information indicator digits consist of a two-digit code, wherein the two-digit code ranges from 00 to 99.

11. The method of claim 1, wherein the call is associated with ANI information and DNIS information, wherein the act of processing said information associated with said call comprises evaluating the information indicator digits in combination with one or both of the ANI and DNIS.

12. The method of claim 1, wherein the information indicator digits are independent of the dialed number.

13. The method of claim 12, wherein the telephone device from which the call has been made is associated with a telephone number, wherein the information indicator digits are further independent of the telephone number associated with the telephone device from which the call has been made.

14. The method of claim 1, wherein the call is associated with ANI information, wherein the ANI information includes a string of seven or ten digits, wherein the information indicator digits precede the string of seven or ten digits.

15. The method of claim 1, wherein the call is associated with ANI information, wherein the information indicator digits further indicate one or more characteristics of the ANI associated with the call.

16. The method of claim 1, wherein the information indicator digits indicate that the call has been made from a cellular phone, wherein the method further comprises handling the call based on the indication that the call has been made from a cellular phone.

17. The method of claim 1, wherein the network path that is predeterminedly associated with calls that are made from the certain type of telephone device from which the call has been made leads to one or more call center agents that are assigned to receive calls that are made from the certain type of telephone device from which the call has been made.

18. A method of handling a call, wherein the call is made from a certain type of telephone device, said method comprising the steps of:
   providing a device with resources which receives and analyzes information associated with said call;
   receiving said information, including information indicator digits, associated with said call at said device, wherein the information indicator digits indicate the certain type of telephone device from which the call has been made;
   processing said information associated with said call, including the information indicator digits;
   determining the certain type of telephone device from which the call has been made based on the information indicator digits; and handling said call in a particular way based on said certain type of telephone device from which the call has been made and said processing of said information associated with said call, wherein the act of handling said call comprises routing the call along a network path that is predeterminedly associated with calls that are made from the certain type of telephone device from which the call has been made, wherein the network path that is predeterminedly associated with calls that are made from the certain type of telephone device from which the call has been made leads to one or more call center agents that are assigned to receive calls that are made from the certain type of telephone device from which the call has been made.

19. The method of claim 18, wherein the network path that is predeterminedly associated with calls that are made from the certain type of telephone device from which the call has been made is dedicated to calls that are made from the certain type of telephone device from which the call has been made.

20. The method of claim 18, wherein the information indicator digits indicate that the call has been made from one or more of:
   i) a multiparty line,
   ii) a private branch exchange,
   iii) a cellular phone,
   iv) a pay phone,
   v) a virtual network,
   vi) a residential phone,
   vii) a business phone, or
   viii) a restricted line.

21. The method of claim 18, wherein the information indicator digits consist of a two-digit code, wherein the two-digit code ranges from 00 to 99.

22. The method of claim 18, wherein the call is associated with ANI information and DNIS information, wherein the act of processing said information associated with said call comprises evaluating the information indicator digits in combination with one or both of the ANI and DNIS.

23. The method of claim 18, wherein the information indicator digits are independent of the dialed number, wherein the telephone device from which the call has been made is associated with a telephone number, wherein the information indicator digits are further independent of the telephone number associated with the telephone device from which the call has been made.

24. The method of claim 18, wherein the call is associated with ANI information, wherein the ANI information includes a string of seven or ten digits, wherein the information indicator digits precede the string of seven or ten digits.

25. The method of claim 18, wherein the call is associated with ANI information, wherein the information indicator digits further indicate one or more characteristics of the ANI associated with the call.

26. The method of claim 18, wherein the information indicator digits indicate that the call has been made from a cellular phone, wherein the method further comprises handling the call based on the indication that the call has been made from a cellular phone.

* * * * *